(12) United States Patent
Hoffmann et al.

(10) Patent No.: US 11,780,257 B2
(45) Date of Patent: Oct. 10, 2023

(54) METHOD FOR PRODUCING A LAMINATED BODY AND A LAMINATING FILM AND LAMINATED BODY AND LAMINATING FILM

(71) Applicant: OVD Kinegram AG, Zug (CH)

(72) Inventors: Michael Hoffmann, Walchwil (CH); René Staub, Hagendorn (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 17/058,404

(22) PCT Filed: May 20, 2019

(86) PCT No.: PCT/EP2019/062994
§ 371 (c)(1),
(2) Date: Nov. 24, 2020

(87) PCT Pub. No.: WO2019/224159
PCT Pub. Date: Nov. 28, 2019

(65) Prior Publication Data
US 2021/0197612 A1    Jul. 1, 2021

(30) Foreign Application Priority Data

May 25, 2018  (DE) .......................... 102018112652.2
Feb. 19, 2019  (DE) .......................... 102019104181.3

(51) Int. Cl.
*B42D 25/47* (2014.01)
*B42D 25/328* (2014.01)
*B42D 25/378* (2014.01)
*B32B 37/00* (2006.01)
*B42D 25/24* (2014.01)
(Continued)

(52) U.S. Cl.
CPC ............ *B42D 25/47* (2014.10); *B32B 37/025* (2013.01); *B42D 25/378* (2014.10); *B32B 2037/1253* (2013.01); *B42D 25/24* (2014.10); *B42D 25/324* (2014.10); *B42D 25/328* (2014.10)

(58) Field of Classification Search
CPC .................. B42D 25/47; B42D 25/328; B42D 2037/1253
See application file for complete search history.

(56) References Cited

U.S. PATENT DOCUMENTS 7,147,746 B2   12/2006  Uchihiro et al.
8,932,425 B2 *  1/2015  Lutz ....................... B42D 25/47
                                                                156/234
(Continued)

FOREIGN PATENT DOCUMENTS

CA         2745913 A1    7/2010
CN       101821110 A    9/2010
(Continued)

OTHER PUBLICATIONS

DE-102014204342-A1 English Translation (Year: 2014).*
(Continued)

*Primary Examiner* — Kyle R Grabowski
(74) *Attorney, Agent, or Firm* — Hoffmann & Baron, LLP

(57) ABSTRACT

A method for producing a laminated body and a laminating inlay, as well as a laminated body, a laminating inlay and a security document, in particular in the form of a bank card, identity card or credit card, with such a laminated body.

23 Claims, 14 Drawing Sheets

(51) Int. Cl.
*B42D 25/324* (2014.01)
*B32B 37/12* (2006.01)

(56) References Cited

U.S. PATENT DOCUMENTS

| | | | |
|---|---|---|---|
| 11,124,010 B2* | 9/2021 | Reuther | B42D 25/47 |
| 2005/0196604 A1 | 9/2005 | Funicelli et al. | |
| 2009/0250158 A1* | 10/2009 | Streb | B42D 25/47 |
| | | | 156/219 |
| 2010/0290121 A1 | 11/2010 | Schilling et al. | |
| 2010/0323131 A1* | 12/2010 | Menz | B42D 25/328 |
| | | | 428/29 |
| 2014/0111837 A1* | 4/2014 | Menz | B42D 25/47 |
| | | | 359/2 |
| 2015/0220056 A1 | 8/2015 | Weiser et al. | |
| 2015/0290959 A1 | 10/2015 | Waumans et al. | |
| 2019/0001735 A1 | 1/2019 | Cathomen et al. | |

FOREIGN PATENT DOCUMENTS

| | | | | |
|---|---|---|---|---|
| CN | 102245394 A | 11/2011 | | |
| DE | 102011050746 A1 | 12/2012 | | |
| DE | 102014204342 A1 * | 9/2015 | | B42D 25/00 |
| DE | 102015104321 A1 | 9/2016 | | |
| DE | 102015121849 A1 | 6/2017 | | |
| EP | 2886357 A2 | 6/2015 | | |
| EP | 3 467 551 A1 | 10/2019 | | |
| JP | 2003-317065 A | 11/2003 | | |
| JP | 2004-142130 A | 5/2004 | | |
| JP | 2017/018135 A1 | 3/2018 | | |
| JP | 6494761 B2 | 4/2019 | | |
| WO | WO-2017102744 A1 * | 6/2017 | | B42D 25/455 |
| WO | WO-2017199982 A1 * | 11/2017 | | B29C 59/02 |
| WO | WO-2017202650 A1 * | 11/2017 | | B42D 25/21 |
| WO | 2017/209284 A1 | 12/2017 | | |
| WO | WO-2017209284 A1 * | 12/2017 | | B42D 25/47 |

OTHER PUBLICATIONS

ISO 2813 https://www.sis.se/api/document/preview/917801/ (Year: 2014).*
WO-2017199982-A1 English Translation (Year: 2017).*
Gloss Level vs Surface Roughness file:///C:/Users/kgrabowski/Documents/e-Red%20Folder/17058404/Gloss%20Level.pdf (Year: 2015).*
WO-2017202650-A1 English Translation (Year: 2017).*
DIN ISO 3219:Oct. 1994 („Kunststoffe—Polymere/Harze in fl0ssigem, emulgiertem oder dispergiertem Zustand—Bestimmung der Viskositat mit einem Rotationsviskosimeter bei definiertem Geschwindigkeitsgefalle Ausgabedatum Oct. 1994).
Chinese Office Action, dated Jan. 5, 2022, in the corresponding Chinese Application/Patent No. 201980034975.7.
Japanese Office Action dated Jan. 31, 2023.

* cited by examiner

METHOD FOR PRODUCING A LAMINATED BODY AND A LAMINATING FILM AND LAMINATED BODY AND LAMINATING FILM

This application claims priority based on an International Application filed under the Patent Cooperation Treaty, PCT/EP2019/062994, filed May 20, 2019, which claims priority to DE 102018112652.2, filed May 25, 2019 and DE 102019104181.3, filed Feb. 19, 2019.

BACKGROUND OF THE INVENTION

The invention relates to a method for producing a laminated body and a laminating inlay, as well as a laminated body, a laminating inlay, and a security document, in particular in the form of a bank card, identity card, data page of a document or credit card or banknote, with such a laminated body.

It is known to produce security documents, in particular bank cards, credit cards and the like, from several laminating sheets fused and/or glued to form a laminated body in a laminating process. As a rule, these security documents have a greater extent transverse to the layering direction of the individual films which are laminated onto each other than in the layering direction. Here, these security documents are usually present in standardized format sizes and thicknesses, such as for example in card form, and security elements, for example an electronic chip, embossings or overprints, are incorporated into the laminated body or applied to the laminated body. Such security documents are characterized in that, due to the laminating process, the successive plies, for example in the form of plastic films, have a particularly good adhesion to each other, and thus both the protection against forgery and the resistance to environmental influences are particularly high.

Such a security element is described for example in EP 2 886 357 B1. This security element has several laminating sheets fused to form a monolithic block in a laminating process. Furthermore, a varnish layer is printed onto one of the laminating sheets before the laminating process is carried out. The laminating sheets are then laminated to form a laminated body in a laminating process in such a way that this varnish layer is arranged inside between two of the laminating sheets and provides a security feature which, because it is laminated in between the laminating sheets, cannot be forged without destroying the laminated body and is particularly well protected from environmental influences.

SUMMARY OF THE INVENTION

The object of the invention is now to specify an improved laminated body and an improved laminating inlay for producing a laminated body, as well as corresponding methods for the production thereof.

This object is achieved by a method for producing a laminated body or a laminating inlay which comprises the following steps:
  providing a first laminating film, in particular made of polycarbonate, with a first surface and a second surface opposite it,
  providing at least one transfer film, which comprises in each case a carrier film and a decorative ply which is detachable from the carrier film and has a first surface opposite the carrier film and a second surface facing the carrier film,
  printing a radiation-curable adhesive on the first surface of the first laminating film and/or the first surface of the decorative ply of the at least one transfer film in such a way that the radiation-curable adhesive is applied to the respective first surface of the first laminating film and/or the decorative ply in one or more first zones and forms a radiation-curable adhesive layer in the one or more first zones, and is not applied to the respective first surface of the first laminating film and/or the decorative ply in one or more second zones,
  applying the at least one transfer film to the first surface of the first laminating film in such a way that at least one partial region of the one or more first zones with the radiation-curable adhesive layer and at least one partial region of the one or more second zones in which the radiation-curable adhesive layer is not applied are arranged between the first surface of the decorative ply and the first surface of the first laminating film,
  at least partially curing the radiation-curable adhesive layer,
  peeling the at least one transfer film off the first laminating film, wherein in one or more first partial regions which overlap with one of the first zones at least in regions the decorative ply is detached from the carrier film when peeled off and remains on the first laminating film, and in one or more second partial regions the decorative ply remains on the carrier film and is peeled off together with the carrier film.

A further post-curing of the adhesive layer can be effected on the basis of an aftertreatment for example by means of a further irradiation or also by means of a standalone further curing reaction over time, such as for example in the case of cationic systems.

For the production of the laminated body, furthermore, several successive films comprising a laminating inlay, produced in such a way, with the first laminating film and the one or more first partial regions with the decorative ply and at least one second laminating film are laminated to form the laminated body.

This object is furthermore achieved by a laminating inlay which is produced in particular according to the above method and has a first laminating film, in particular made of polycarbonate, with a first surface and a second surface opposite it, wherein at least one decorative ply which is detached from a carrier film of at least one transfer film and a radiation-curable adhesive layer, which is at least partially cured, arranged between the decorative ply and the first surface of the first laminating film are provided in one or more first partial regions, and the at least one decorative ply is not provided, and is peeled off with the carrier film, in one or more second partial regions.

This object is furthermore achieved by a laminated body, in particular produced according to the above-mentioned method, which comprises several successive films with a first laminating film, in particular made of polycarbonate, and at least one second laminating film, which are laminated to each other to form a laminated body, wherein the first laminating film has a first surface and a second surface opposite this first surface, and wherein at least one decorative ply detached from a carrier film of at least one transfer film and a radiation-curable adhesive layer, which is at least partially cured, arranged between the decorative ply and the first surface of the first laminating film are provided in at least one or more first partial regions, and the at least one decorative ply is not provided, and is peeled off together with the carrier film, in one or more second partial regions.

This object is furthermore achieved by a security document with such a laminated body as well as the use of such a laminating inlay for producing a laminated body or a security document.

The invention is based on the knowledge that individually structured decorative layers, which are protected by the radiation-curable adhesive layer from destruction and/or degradation in the subsequent laminating process, can be produced on a laminating film by the overprinting of the radiation-curable adhesive layer in regions and the above-described transfer process. Thus, in the case of the present invention, the radiation-curable adhesive layer performs a "double function". On the one hand, this adhesive layer serves to make it possible to apply to a laminating film, in a structured, individual manner, decorative layers which in particular cannot be applied by means of printing methods and/or thermal stamping methods, or can be applied insufficiently or not in the desired layer thickness or resolution. Moreover, it has surprisingly been shown that the radiation-curable adhesive layer furthermore stabilizes these decorative layers applied during the laminating process and in particular counteracts a degradation of the optical effects of the decorative layers. This stabilization can be achieved because, when the radiation-curable adhesive is cured and during the crosslinking reactions occurring in the process, a "stabilizing structure" which is very stable vis-à-vis the action of heat and pressure and is arranged registration-accurate, and which protects the decorative layer in a registration-accurate manner from the influences of pressure and temperature of the laminating process and furthermore provides a corresponding uniform load per unit area of the decorative layers, is provided in the region of the transferred decorative layers. For one thing, this makes it possible to use decorative layers which, without the above-named stabilization, on their own are very thin and mechanically unstable and/or also sensitive to the influences of temperature.

The decorative ply per se can thus be designed such that, when transferred, it allows a high resolution, because it can be detached from the carrier film in a defined manner as very small regions because of its small layer thickness and fragility. The one or more at least partially present decorative layers are correspondingly also transferred with high resolution.

Furthermore, it is not necessary to use heat or pressure to initiate the crosslinking reaction and structure the decorative layer, with the result that the thermal loading and the pressure loading of both the decorative layers and the laminating film can also be kept very low during the transfer process. Because of the correspondingly registration-accurate provision of this stabilizing structure to the transferred decorative layers and the provision of the second partial regions, corresponding "bonding bridges" are furthermore also provided, with the result that the advantages of using a laminating method are still preserved and a correspondingly stable layer bond can still be achieved when the laminating inlay according to the invention is used.

Advantageous embodiments of the invention are described in the dependent claims.

By a laminating film and a laminating inlay is meant a single- or multi-layered film which can be laminated with one or more further layers, in particular laminating films, to form a laminated body, in particular a monolithic laminated body, in a laminating process. This film is here preferably formed by a single- or multi-ply plastic film which consists of a thermoplastic at least on one of its surfaces in regions, and thus makes it possible to "weld" these surfaces to a further laminating film at least in regions in a laminating method. This film preferably has one or more layers made of a thermoplastic, in particular of polycarbonate, PVC or PET, which preferably form the main constituent of this film.

Furthermore, additional layers can be used which already produce a bond at low temperatures, or for example join materials together, such as for example polyester and polycarbonate, which do not have good adhesion to each other when laminated. Examples of this are thermoplastic polyurethane or reactive adhesive layers.

By a laminating method is meant a method in which two or more layers are joined to each other through the use of heat and pressure, wherein here one or more layers are fused at their layer boundary at least in regions, and thus one or more of the layers are fused to each other at least in regions. In a laminating method, the films here are preferably heated to a temperature of more than 120° C. and pressed onto each other by means of pressure at the same time. The temperature required during the laminating is dependent on the materials used, and is for example much lower in the case of PVC than in the case of polycarbonate. If different materials are to be joined to each other, additional layers can act as adhesive layer, such as for example thermoplastic polyurethane.

By a laminated body is meant a body which has a layer composite of two or more films which are joined to each other in a laminating method, in particular are joined to form a monolithic block in a laminating method, for example fused and/or glued.

During the laminating, the one or more first partial regions with the decorative ply are preferably arranged inside between the first laminating film and the at least one second laminating film. The one or more second partial regions in which the decorative ply is not provided on the first laminating film ensure that in these regions no foreign material, in particular in the form of a transfer ply, interferes with the bond of the first and second laminating films during the laminating and thus a correspondingly good inter-layer adhesion between the first and second laminating films can be achieved when the laminating method is carried out. This is the case in particular when the first and second laminating films consist of the same material, for example of PVC or polycarbonate.

Both the production of the laminating inlay and the performance of the laminating method can here be effected in a roll-to-roll machining process, in a roll-to-sheet machining process or in a sheet-based machining process.

Here, it is furthermore advantageous to use a registration method when this method is carried out, which ensures a registration-accurate printing of the radiation-curable adhesive on the first laminating film and/or the at least one transfer film, a registration-accurate application of the transfer film to the first laminating film and/or a registration-accurate application of the at least one second laminating film to the laminating inlay when the laminating method is carried out.

By register or registration, or register accuracy or registration accuracy, is meant a positional accuracy of two or more elements and/or layers relative to each other. The register accuracy is to range within a predefined tolerance, which is to be as small as possible. At the same time, the register accuracy of several elements and/or layers relative to each other is an important feature in order to increase the process reliability. The positionally accurate positioning can be effected in particular by means of sensorially, preferably optically, detectable registration marks or register marks. These registration marks or register marks can either represent specific separate elements or regions or layers or themselves be part of the elements or regions or layers to be positioned.

By a registration method or registration is meant here that one or more of the method steps are effected registered or registration-accurate relative to structures on or in the first and/or second laminating film and/or the one or more transfer films, and thus possibly preceding method step. Carrying out the registration method or the registration thus ensures that the arrangement of the first or second partial regions produced by means of this method are arranged registered, register-accurate or registration-accurate relative to these structures, and thus are arranged in a predefined positional arrangement relative to each other.

When the registration or registration method is carried out, register marks on the respective transfer film or the transfer films and/or the first laminating film and/or the second laminating film are preferably detected. These register marks can consist for example of an overprint and/or perforations. The positional arrangement of the structures is determined by means of detecting these register marks. However, the structures can also be detected directly, for example by means of a camera and corresponding image-processing software. The structures can also be optically diffractive features which are advantageously present together with optically diffractive register marks. Furthermore, in dependence on this, in particular the printing of the radiation-curable adhesive, the respective application of the one or more transfer films to the first laminating film and/or the application of the first laminating film or the laminating inlay to the second laminating film is controlled or regulated in such a way that the desired structures are correspondingly arranged positionally accurate relative to each other. For this, it is advantageous, for example on the basis of the detected register marks, to adjust the position of the film webs correspondingly, for example by stretching the respective transfer films and/or the first laminating film and/or the second laminating film and/or by corresponding changes in the distances, and/or by tracking the printing tool, for example by adapting the speed of the decorative print cylinder in the case of flexographic printing and/or by synchronized activation of a digital printing, for example in the case of inkjet printing, with the result that the desired positional conditions are achieved and the structures are correspondingly positioned positionally accurate relative to each other.

Preferably, during the laminating, at least one second laminating film is here applied to the first laminating film in such a way that in a first region of surface one or more of the first partial regions with the decorative ply and the radiation-curable adhesive layer are arranged between the first surface of the first laminating film and a first surface of the at least one second laminating film facing the first laminating film. Furthermore, it is advantageous here that the first surface of the first laminating film and that of the second laminating film touch in a second region of surface.

The first region of surface is thus formed by the total surface area of the one or more first partial regions with the decorative ply arranged between the first and the second laminating film and the second region of surface is formed by the total surface area of the one or more second partial regions without the decorative ply arranged between the first and the second laminating film.

Then, during the laminating, the first surface of the first laminating film and that of the second laminating film are preferably fused and/or glued to each other in the second region of surface. It is hereby ensured that, on the one hand, a particularly secure surface bond between the first and second laminating films is achieved during the laminating and, on the other hand, the decorative ply is correspondingly protected in the laminated body.

The radiation-curable adhesive layer is here preferably cured before the laminating in such a way that the radiation-curable adhesive layer is substantially dimensionally stable under the conditions of the laminating method carried out during the laminating.

Unlike amorphous thermoplastics, such as for example polycarbonate, amorphous PET or PVC, the radiation-cured adhesive retains a sufficient mechanical stability at the typical laminating temperatures. Although this can be reduced slightly as the temperature increases, it stays much higher than that of the surrounding softened laminating material.

The deformation of the radiation-curable adhesive layer is here preferably determined in that the molding of the adhesive layer before the laminating method is carried out and after the laminating method has been carried out is detected and the average percentage deviation from the starting shape after the laminating method has been carried out is determined.

Furthermore, it is advantageous if, during the laminating, the deformation of the decorative ply in the at least one first region of surface by the radiation-curable adhesive layer is reduced by more than 50%, in particular is reduced by more than 80%. The deformation of the decorative ply is here determined in the same way as the deformation of the radiation-curable adhesive layer and here the deformation of the decorative ply with the use of the radiation-curable adhesive layer and that without the use of the radiation-curable adhesive layer are correspondingly compared with each other.

Tests have shown that, through such a design of the radiation-curable adhesive layer, an optical degradation of the decorative ply can be largely prevented and thus the optical quality of the laminated body or security document can be significantly improved.

In a security document, in particular, the area ratio of the first region of surface to the sum of first and second regions of surface is preferably not more than 80%, in particular between 2% and 80% and further preferably between 5% and 50%, Tests have shown that, with these area ratios, on the one hand the inter-layer adhesion between the first and second laminating films is still sufficient after laminating to prevent forgery attempts, yet on the other hand the optical design possibilities are not restricted hereby.

Furthermore, tests have shown that the inter-layer adhesion between the first laminating film and the second laminating film after the laminating is dependent not only on the area ratio of the first region of surface to the second region of surface, but moreover is also dependent on the design of the first and second partial regions. Here, it has proved to be particularly advantageous that the one or more first partial regions have a width of no more than 8 mm, in particular no more than 5 mm.

Furthermore, it is advantageous if a minimum spacing between several first partial regions is more than 1 mm. It is furthermore advantageous if the area density of the first partial regions is less than 80%, for a reference size of 1 $cm^2$. Tests have shown that one or more of the above-mentioned properties ensure that in the case of attempts to tear it off a punctiform detachment or delamination of the laminated body is largely prevented.

A further advantage of relatively small-area first partial regions separated from each other is that the danger of tears and/or curling and/or buckling because of the material flow of the laminating films during laminating to form the laminating body is reduced.

By the width of a region, partial region or region of surface is meant here the shortest distance between two opposite edges of the respective region. By length is meant the longest distance between two opposite edges of the respective region.

It has furthermore proved to be advantageous that the first partial region(s) and/or the second partial region(s) have a width of 0.1 mm or more, in particular a width of more than 0.2 mm. Tests have shown that this ensures that the corresponding partial regions of the decorative ply are not shifted relative to each other by the forces acting during the laminating, and thus that the graphic design through the decorative ply is not degraded in this respect by the forces acting during the laminating.

It has furthermore proved to be advantageous that one or more of the first partial regions and/or one or more of the second partial regions have a width of between 0.1 mm and 0.6 mm, preferably between 0.1 mm and 0.4 mm. Through a corresponding design of the first and/or second partial regions, it is possible to optically conceal the "rasterization" of the region of surface of the laminated body into first and second partial regions, and thus also to produce large-area, continuously appearing graphic designs in the laminating body.

It has furthermore proved to be advantageous that one or more of the first partial regions and/or of the second partial regions form raster elements of a raster. The individual raster elements here can have any desired shape, and can be designed individually differently or have a uniform shape, for example in the form of a circle, a square, a rhombus, a pictogram or the like. The lateral extents of the raster elements, i.e. the width and length of the raster elements, here are preferably chosen in the range between 0.1 mm and 0.6 mm. However, it is also possible to use larger raster elements. The raster elements are preferably provided in a regular one- or two-dimensional arrangement in the raster. However, it is also possible for the sequence of the individual raster elements not to be constant, but to be varied, in particular also randomly or pseudo-randomly varied or varied according to a fractal pattern. The raster preferably comprises more than 10 raster elements, further preferably more than 20 raster elements.

It has been shown that, through such a design of first and second partial regions, a particularly good inter-layer adhesion between the first and second laminating films is achieved. It is hereby ensured that first and second partial regions correspondingly repetitively follow on from each other, and thus large-area regions, which can impair the inter-layer adhesion, are avoided. Moreover, this also makes it possible to produce large-area graphic representations without impairing the inter-layer adhesion in the laminating body.

One or more second partial regions are preferably provided, which are delimited by an outer edge of the laminated body, preferably are delimited by all outer edges of the laminated body. Such an arrangement ensures that a particularly high inter-layer adhesion is achieved in the edge regions of the laminated body, and thus that the resistance to environmental influences and the protection against forgery are further increased. These second partial regions preferably have a width of more than 2 mm, preferably of more than 4 mm.

Moreover, it has proved worthwhile to choose the area ratio of the first region of surface to the region of surface such that the adhesion, and thus the separating force necessary to detach the first laminating film from the second laminating film, is more than 3.5 N. And this preferably in the case of a measurement with a peel angle of 90°, a peeling speed of 300 mm/min and a strip width of 10 mm. A measurement method suitable for this is described for example in ISO/IEC 10373-1. Here, the minimum value of the measured separating force is preferably determined over a peel distance of at least 20 mm, wherein the first and the last 5 mm of the distance are not taken into account, nor are drops or other swings in the separating force over a distance of less than 1 mm.

The peel angle is here preferably produced by means of the use of a corresponding roller, which preferably has a diameter of 10 mm.

In order to ensure the above-described molding of the first and second partial regions of the laminated body, during the production of the laminating film a corresponding pattern of first and second partial regions is produced on the first laminating film and a corresponding section of the first laminating film is laminated with the second laminating film to form the laminated body.

A radiation-curable adhesive is an adhesive which cures by polymerization or crosslinking reaction, forming long-chain molecules, which is induced at least partially by irradiation by means of a radiation source. Such adhesives contain e.g. reactive acrylates, epoxies or enol ethers and photoinitiators. During exposure to light, the photoinitiators form radicals or reactive cations (superacids) and hereby induce a polymerization or crosslinking reaction of longer-chain molecules. Depending on the radiation-curable adhesive, the crosslinking reaction can be effected with irradiation at different wavelengths.

It is also possible here for the radiation-curable adhesive to have several different photoinitiators which respond differently to different wavelengths or wavelength ranges. It is hereby possible to carry out the curing of the radiation-curable adhesive incrementally in a targeted manner and hereby also to achieve the advantages described in the following.

In the printing, a radiation-curable adhesive which has a higher softening temperature than the first laminating film and/or the second laminating film after the curing has been carried out, in particular has a softening temperature at least 10 K, preferably more than 20 K, higher than the first and/or second laminating film is preferably printed. It is hereby ensured that when the laminating method is carried out the radiation-curable adhesive layer is much more dimensionally stable than the first or the second laminating film, and thus provides a particularly good mechanical protection for the decorative ply during the laminating.

It is also possible to use radiation-curing hybrid systems which cure after various further chemical reactions such as e.g. thermal reaction.

In particular the flexibility of the adhesive layer can thereby be adapted to the requirements. On the one hand, there is enough dimensional stability to counteract a degradation of the transfer plies during the laminating to form the laminated body, while on the other hand there is enough flexibility that no breaking or cracking takes place in the transfer plies, such as can occur in the case of very brittle and inflexible layers.

The printing of the radiation-curable adhesive is preferably performed with an application weight of between 0.2 g/m$^2$ and 20 g/m$^2$, preferably between 0.5 g/m$^2$ and 10 g/m$^2$, further preferably between 0.5 g/m$^2$ and 5 g/m$^2$. Furthermore, the desired layer thickness can also be achieved in that both the first laminating film and the transfer film are printed on in a registered manner, wherein the layer thicknesses of the portions of the radiation-curing adhesive on the first laminating film or on the transfer film can preferably have values between 10% and 90% of the total thickness of the radiation-curing adhesive to be applied in total (100%). For example, 10% of the radiation-curing adhesive can thus be applied to the transfer film and the remaining 90% can be applied to the first laminating film, or vice versa.

Tests have shown that when such an application weight is used, on the one hand, the radiation-curable adhesive layer has a sufficiently mechanical stability in order to protect the decorative ply when the laminating method is carried out but, on the other hand, the edge sharpness, by means of which the transfer of the decorative ply is effected, is not appreciably lessened.

The printing of the radiation-curable adhesive is preferably effected by means of flexographic printing, screen printing, gravure printing or inkjet printing. Tests have shown here that a high edge sharpness of the transferred decorative ply regions can be achieved through the use of flexographic printing. A particularly cost-effective printing with a high print speed can be achieved in particular through the use of a continuous roll-to-roll process. The advantages of printing by means of inkjet printing are in particular that an individualization of the adhesive overprint and thus a corresponding individualization of the decoration produced by the decorative plies transferred can be achieved hereby.

Depending on the printing method, different viscosity ranges are advantageous. For example, low viscosities are preferred for gravure printing, mid-level viscosities are preferred for flexographic printing and higher viscosities are preferred for screen printing.

The radiation-curable adhesive preferably has a dynamic viscosity of between 400 mPas and 2,000 mPas, preferably between 500 mPas and 1,200 mPas, further preferably between 500 mPas and 800 mPas during the printing, in particular by means of flexographic printing. Tests have shown that a particularly good print quality, with regard both to the resolution of the overprint and to a sufficient area coverage of the printed regions for the subsequent transfer, can be achieved by setting a corresponding viscosity. The viscosity here is preferably determined according to DIN ISO 3219:1994-10 ("Plastics—Polymers/resins in the liquid state or as emulsions or dispersions—Determination of viscosity using a rotational viscometer with defined shear rate" publication date 1994-10), for example using a HAAKE Viscotester® VT550 (Thermo Fischer Scientific Inc., Waltham, MA, USA), further preferably using a DIN adapter according to DIN 53019 of a cylinder measurement device NV and a measuring cup NV [NV].

Adhesive components can be for example monoacrylates, diacrylates, triacrylates, oligomers and monomers. The curing of the adhesive can be effected for example using a standard mercury-vapor lamp. The UV dose required is dependent on the adhesive system. UV doses of more than 50 mJ/cm$^2$ are typically required. The mercury-vapor lamp can also be an iron- or gallium-doped emitter. The IR input, which at best leads to an undesired heating of the first laminating film and/or the transfer film, is advantageously reduced by filters or cold-light reflectors. Furthermore, UV-LED emitters can also be used as radiation sources. Their maximum intensity preferably lies in the wavelength range of from 330 nm to 410 nm. Furthermore, flashing light emitters, which provide a high intensity for a short time, can also be used as radiation sources. The emitters can also be used segmented. In the process it is not the whole web width that is irradiated with the radiation, but primarily the region in which the radiation-curing adhesive was printed. Such a segmentation can be effected for example by a mask or by switching selective segments on and off in the case of UV-LED emitters. The first laminating film and/or the transfer film are in the process preserved against at best harmful radiations.

The at least partial curing of the radiation-curable adhesive layer is effected by means of irradiation by means of one or more radiation sources. It is possible here for the curing to be effected in one curing step or also to be effected in several curing steps, as stated below. The irradiation is preferably effected in a wavelength range below 500 nm and in particular by means of UV light. Particularly the use in the wavelength regions of 250 nm and/or 310 nm and/or 365 nm and/or 395 nm and/or 420 nm has proved worthwhile for curing the radiation-curable adhesive layer, Typical power peaks are found in these regions in the case of mercury-vapor lamps or high-power UV-LEDs are commercially available in these regions. For these reasons, photoinitiators customary in the trade are also designed for these wavelength regions.

It is furthermore advantageous if the first laminating film and/or the at least one transfer film has a transparency of more than 10% for at least one wavelength range of the irradiation in which the at least one photoinitiator is sensitive. It is hereby ensured that a sufficient curing can be achieved, but no degradation of the laminating film and/or the decorative ply is brought about by the energy input effected.

The specific emission spectrum of the UV emitter used for the curing is to be taken into account. If, for example, a UV-LED emitter with a peak wavelength of 365 nm and a half width of 30 nm is used, then the transparency in this range, as in particular in this example, between 355 nm and 395 nm, is important and it is preferably to be ensured by corresponding material selection that there is a transmissivity of more than 10% over this wavelength range.

The radiation-curable adhesive is preferably cured in one curing step after or during the printing of the radiation-curable adhesive on the first surface of the first laminating film and/or the decorative layer and before the application of the at least one transfer film to the first surface of the first laminating film. By means of such a pre-curing, it is possible to prevent or limit a "running" of the adhesive overprint on the first surface of the laminating film and/or the decorative ply, and thus to further improve the contour sharpness of the overprint.

Here, the dynamic viscosity of the radiation-curable adhesive is preferably increased by means of such a pre-curing during the printing or after the printing and before the application of the at least one transfer film to the first surface of the first laminating film by a dynamic viscosity between 20 mPas and 3,000 mPas, preferably between 50 mPas and 1,000 mPas. The advantages already listed above are hereby achieved.

A further option is to heat the radiation-curing adhesive in the varnish tank of the corresponding printing station in order to reduce the viscosity to a range suitable for the printing. After the printing, the varnish cools down and the viscosity increases again, During the feeding of the at least one transfer film, because of the increased viscosity, the fine details of the print are more easily preserved than in the case of a thinner adhesive. The heating can be effected for example to 30° C. to 80° C., preferably to 30° C. to 60° C.

Radiation-curable adhesive is preferably pre-cured by means of this curing step to a degree of cure between 10% and 50%, furthermore between 20% and 30%.

It is furthermore advantageous to cure the radiation-curable adhesive layer in a curing step after or during the application of the at least one transfer film to the first surface of the first laminating film and before the at least one transfer film is peeled off the first laminating film, in particular to a degree of cure of more than 50%, preferably of more than 80%. The proportion of non-polymerized monomers and/or oligomers is correspondingly less than 50%, preferably less than 20%. Through this curing, the adhesion between the decorative ply and the first laminating film is increased and the detachment of the decorative ply in the one or more first partial regions is hereby improved. However, it is also possible to dispense with this curing step, if a corresponding detachment layer is used in the transfer film and if the inter-layer adhesion of the radiation-curable adhesive layer and the decorative ply and/or the first laminating film is sufficient.

A complete curing of the adhesive layer is preferably still not effected in this curing step, because of the points listed below.

The radiation-curable adhesive layer is furthermore preferably cured in a curing step after or during the peeling of the at least one transfer film off the first laminating film and before the laminating to form the laminating body, in particular cured to a degree of cure of more than 80%, further preferably between 80% and 90%. The performance of such a curing step makes it possible to set the degree of cure of the radiation-curable adhesive layer in a particularly targeted manner for the requirements of the laminating method. And this because when such a curing step is carried out the carrier film has already been peeled off the decorative ply and the edge regions of the radiation-curable adhesive layer are uncovered at the boundary between the first and second partial regions of the laminating film, and thus the irradiation can be effected in a correspondingly pinpoint accurate and precisely dosed manner.

The mechanical and/or temperature-dependent properties of the adhesive layer are determined not only by the degree of cure, i.e. the degree of polymerization, but also by the formulation of the adhesive. Thus, in part, thermoplastic properties of the adhesive can also be present.

It is advantageous here not to cure the radiation-curable adhesive layer completely yet, but only to cure it to a degree of cure between 50% and 90%. Thus, tests have shown that in the case of a complete cure of the radiation-curable adhesive layer when the laminating method is carried out the adhesive layer tends to form breaking edges, and thus can no longer perform its protective function in full. An incomplete cure of the radiation-curable adhesive layer ensures a sufficient flexibility of the adhesive layer, and the optical quality of the laminating body is hereby improved.

The radiation-curable adhesive layer is preferably cured in a curing step after the laminating, in particular completely cured or cured to a degree of cure between 80% and 95%.

The preceding curing steps are preferably carried out by means of a respectively allocated radiation source which is arranged or positioned correspondingly in the individual curing steps. With reference to the structure of the radiation source, reference is made to the above statements. It is furthermore pointed out that when the method according to the invention is carried out any desired combination of the above-listed curing steps can be realized and the curing of the radiation-curable adhesive layers can also be effected merely by means of one of the preceding curing steps.

It is furthermore particularly advantageous if the surface of the first laminating film and/or the first surface of the decorative ply have a surface roughness Re of less than 3 µm, preferably of less than 1.5 µm, further preferably of less than 0.6 µm. Tests have shown that, through the choice of such a surface roughness, on the one hand, the edge sharpness of the radiation-curable adhesive layer is improved and/or a complete transfer of the transfer ply is made easier and, on the other hand, the optical appearance of the laminated body is furthermore improved.

The first and/or second laminating film preferably consists of polycarbonate or has polycarbonate as main constituent. The first and second laminating films can here also consist of several layers and can furthermore also have layers of PET, GABS, PVC or consist of one of these plastics. The thickness of the first and/or second laminating film is preferably between 30 µm and 400 µm, in particular between 40 µm and 130 µm. It is furthermore preferred if the first and second laminating films consist, at least on their facing surfaces, of the same plastic material or a largely corresponding plastic material, for example both the first and second laminating films consist of polycarbonate. If different plastic layers are used for the first and the second laminating film, for example PET, PC (polycarbonate), it is advantageous to use an adhesion-promoting layer, for example made of thermoplastic polyurethane (PU) or of polyvinyl chloride (PVC) or of acrylate, which increases the adhesion of the laminating films during the laminating, on the side facing the other laminating film.

It is also advantageous that during the laminating of several successive films comprising the first laminating film with the one or more first partial regions with the decorative ply and the at least one second laminating film to form the laminated body the at least one second laminating film comprises polyvinyl chloride and is arranged on the side of the first surface of the first laminating film and/or the several successive films comprise one or more further laminating films, which have one or more of the following films, in particular wherein the first laminating film comprises polycarbonate:

a first laminating film of the one or more further laminating films, which comprises polyvinyl chloride and is arranged on the side of the second surface of the first laminating film, a second laminating film of the one or more further laminating films, which comprises polycarbonate and is arranged on the side of the first laminating film of the one or more further laminating films facing away from the first laminating film, a third laminating film of the one or more further laminating films, which comprises polyvinyl chloride and is arranged on the side of the first and/or second laminating film of the one or more further laminating films facing away from the first laminating film, a fourth laminating film of the one or more further laminating films, which comprises polyvinyl chloride and is arranged on the side of the second laminating film facing away from the first laminating film.

A film made of polycarbonate (PC) or polyvinyl chloride (PVC) and/or a film which comprises polycarbonate or polyvinyl chloride preferably has polycarbonate or polyvinyl chloride as main constituent, and in particular has further constituents, or consists entirely of polycarbonate or polyvinyl chloride.

Here, in particular at least the second laminating film of the one or more further laminating films is provided with a decorative ply in one or more first partial regions of the second laminating film of the one or more further laminating films, preferably by means of the steps with which the first laminating film with the one or more first partial regions with the decorative ply is produced, preferably wherein the second laminating film of the one or more further laminating films is used instead of the first laminating film in corresponding steps and in particular wherein the decorative ply, the one or more first partial regions and/or the one or more second partial regions are designed differently.

In particular, the following steps for producing the laminated body or a further laminating inlay are possible with this:

Providing at least one of the one or more further laminating films, in particular the second laminating film of the one or more further laminating films, made of polycarbonate with a further first surface and a further second surface opposite it.

Providing at least one further transfer film, which comprises in each case a further carrier film and a further decorative ply which is detachable from the further carrier film and has a further first surface opposite the further carrier film and a further second surface facing the further carrier film.

Printing a radiation-curable adhesive on the further first surface of the at least one of the one or more further laminating films, in particular the second laminating film of the one or more further laminating films, and/or the further first surface of the further decorative ply. Here, the radiation-curable adhesive is applied in one or more further first zones to the respective further first surface of the at least one of the one or more further laminating films, in particular the second laminating film of the one or more further laminating films, and/or the further decorative ply, and in the one or more further first zones forms a further radiation-curable adhesive layer. In one or more further second zones the radiation-curable adhesive is preferably not applied to the respective further first surface of the at least one of the one or more further laminating films, in particular the second laminating film of the one or more further laminating films, and/or the respective further decorative ply.

Applying the at least one further transfer film to the further first surface of the at least one of the one or more further laminating films, in particular the second laminating film of the one or more further laminating films. It is advantageous here that at least one partial region of the one or more further first zones with the further radiation-curable adhesive layer and at least one partial region of the one or more further second zones in which the further radiation-curable adhesive layer is not applied are arranged between the further first surface of the respective further decorative ply and the further first surface of the at least one of the one or more further laminating films, in particular the second laminating film of the one or more further laminating films.

At least partially curing the further radiation-curable adhesive layer.

Peeling the at least one further transfer film off the at least one of the one or more further laminating films, in particular the second laminating film of the one or more further laminating films. It is expedient here that in one or more further first partial regions which overlap with at least one of the further first zones at least in regions the further decorative ply is detached from the further carrier film when peeled off and remains on the at least one of the one or more further laminating films, in particular the second laminating film of the one or more further laminating films, and in one or more further second partial regions the further decorative ply remains on the further carrier film and is peeled off with the further carrier film.

For producing the laminated body, the following step is furthermore possible in particular laminating several successive films comprising the first laminating film with the one or more first partial regions with the decorative ply, at least one second laminating film and/or with one or more further laminating films, in particular the first laminating film of the one or more further laminating films, the second laminating film of the one or more further laminating films, preferably with the one or more second partial regions with the further decorative ply, the third laminating film of the one or more further laminating films and/or the fourth laminating film of the one or more further laminating films, to form the laminated body.

The details regarding the radiation-curable adhesive layer preferably apply correspondingly to the further radiation-curable adhesive layer and/or the details regarding the decorative ply of the first laminating film apply correspondingly to the further decorative ply of the at least one of the one or more further laminating films, in particular the second laminating film of the one or more further laminating films.

The details regarding the one or more first and second partial regions, the first and second surfaces and/or the one or more first and second zones of the first laminating film and/or the decorative ply, the radiation-curable adhesive layer preferably apply correspondingly to the one or more further first and further second partial regions, the further first and further second surfaces and/or the one or more further first and further second zones of the at least one laminating film of the one or more further laminating films, in particular the second laminating film of the one or more further laminating films.

The details, in particular with respect to the fusing, the regions of surface and/or the area ratio, of the first laminating film preferably apply correspondingly to the second laminating film of the one or more further laminating films, in particular wherein the details, preferably with respect to the fusing, the regions of surface and/or the area ratio, of the second laminating film apply correspondingly to the first and/or third laminating film of the one or more further laminating films.

It is furthermore also possible for one or more additional laminating films made of polyvinyl chloride and/or polycarbonate to be arranged on and/or between the first laminating film, the at least one second laminating film and/or one or more laminating films of the one or more further laminating films and in particular also to be laminated to form the laminated body during the laminating of several successive films comprising the first laminating film with the one or more first partial regions with the decorative ply and the at least one second laminating film to form the laminated body.

Here, it is possible for an additional decorative ply to be applied to one or more laminating films of the one or more additional laminating films, in particular to the first laminating film of the one or more additional laminating films, which preferably comprise polycarbonate, in particular with the result that one or more additional laminating inlays are formed. Here, the details and/or statements for the first laminating film and the decorative ply preferably also apply to the corresponding additional laminating film and the corresponding additional decorative ply. With this, an additional laminating inlay in particular also has an additional radiation-curable adhesive layer, an additional first partial region with the additional decorative ply, and/or an additional second partial region.

Furthermore, it is expedient that the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, are transparent, semi-transparent and/or opaque at least over part of the surface or over the whole surface, in particular are transparent, semi-transparent and/or opaque in the wavelength range visible to the human eye.

By transparent is preferably meant a transmittance in the range of from 50% to 99%. Furthermore, by semi-transparent is meant in particular a transmittance in the range of from 30% to 50% and by opaque is preferably meant a transmittance in the range of from 0% to 30%.

It is also possible here for the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films to be, and/or to be provided, opaque, semi-transparent and/or transparent in the UV range and/or in the IR range, in particular in the wavelength range of from 9,400 nm to 10,600 nm and/or in the wavelength range of from 946 nm to 1,444 nm, preferably at a wavelength of 1,064 nm over part of the surface or over the whole surface.

Preferably, at least one laminating film, which is selected from the following films, is laserable: the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films. In particular, the first laminating film and/or the second laminating film of the one or more further laminating films are laserable. Advantageously, the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, are machined, preferably individualized, in particular after the laminating to form the laminated body, by means of a laser, in particular by means of an Nd:YAG laser.

A laserable laminating film, in particular the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films here is preferably opaque in the laser wavelength range, for example in the wavelength range of from 946 nm to 1,444 nm, preferably at a wavelength of 1,064 nm, at least over part of the surface, wherein plies arranged over and/or under the laserable ply are preferably transparent in the range of the respective laser wavelengths.

The laser is preferably carried out through the one or more first partial regions and/or the one or more further first partial regions, with the result that a lasered partial region, in particular when viewed perpendicular to a plane spanned by the first laminating film, preferably in the direction from the second laminating film to the first laminating film, is arranged registration-accurately over, under and/or next to the decorative ply in the one or more first partial regions and/or the further decorative ply in the further first partial regions and/or is arranged to the additional decorative ply in the additional first partial regions.

A lasering which is register-accurate relative to the decorative ply and/or the further decorative ply and/or the additional decorative ply, and which guarantees a particularly high level of protection against forgery, in particular if the decorative ply and/or the further decorative ply and/or the additional decorative ply form one security feature, is advantageously possible hereby.

The lasered partial region is preferably designed patterned. The lasered partial region preferably has a grayscale image, in particular through a halftone raster generated by means of lasers. Furthermore, the grayscale image is possible by means of the lasering in particularly high-quality resolution and/or with a particularly large number of grayscales, in particular compared with conventional laminated bodies which comprise films made of polyvinyl chloride.

By a "grayscale image" is preferably meant here an image which allocates the respective color value in the form of a corresponding grayscale value or lightness value of the allocated color channel to the respective image points of the motif. These grayscale values or lightness values can in particular also be generated in each case by a fine rasterization of binary raster points, wherein the raster points preferably generate the impression of grayscale values or lightness values for the human eye. A grayscale image is preferably easy to detect by a human observer and/or an observing machine. For example, the molding of the portrait of a holder of a security document on or in the security document is conceivable.

In particular, the advantage thus results that several functions can be fulfilled by the first laminating film, which in particular comprises polycarbonate, and/or one or more laminating films of the one or more further laminating films, in particular the second laminating film of the one or more further laminating films, and/or one or more additional laminating films, in particular the first and/or second laminating film of the one or more additional laminating films, which in particular comprise polycarbonate, such as for example opacity, in particular in the IR laser range, and/or individualizability and mechanical and/or thermal resistance.

For example, other films and/or plastic plies, such as for example a film made of polyvinyl chloride, are less advantageously suitable. In particular, the representation of grayscale images is more advantageous by means of lasering into laserable PC than by means of lasering into laserable PVC, as binary black-and-white images are more easily generated in laserable PVC.

However, it is also conceivable for a lasering to be carried out before and/or after the laminating of several successive films comprising the first laminating film with the one or more first partial regions with the decorative ply and the at least one second laminating film to form the laminated body.

In particular, one of the sequences PVC/PC/PVC and/or PVC/PVC/PC/PVC/PVC and/or PVC/PC/PVC/PC/PVC and/or PVC/PVC/PC/PVC/PC/PVC/PVC of the plastics polycarbonate (PC) and polyvinyl chloride (PVC) is possible. For example, the following layer structure is conceivable:

optional fourth laminating film of the one or more laminating films made of PVC,
second laminating film made of PVC,
first laminating film made of PC,
first laminating film of the one or more further laminating films made of PVC
optional second laminating film of the one or more further laminating films made of PC,
optional third laminating film of the one or more further laminating films made of PVC,
optionally an additional laminating film of the one or more additional laminating films made of PVC.

In particular, it is possible here for the first laminating film and/or one or more further laminating films, in particular the first laminating film of the one or more further laminating films, to be single- or multi-layered. In particular, it has proved to be advantageous that the first laminating film of the one or more further laminating films has one or more layers made of polyvinyl chloride and/or acts as adhesion promoter between the first laminating film and the second laminating film of the one or more further laminating films.

It is advantageous in particular that at least two laminating films comprise polycarbonate and, during the laminating of several successive films comprising the first laminating film with the one or more first partial regions with the decorative ply and the at least one second laminating film to form the laminated body, are joined to each other via an adhesive layer and/or at least one layer of polyvinyl chloride.

In particular, in other words, two laminating films comprising polycarbonate preferably should not directly adjoin each other, as a sufficient bond, in particular a material-bonding bond, of the films made of polycarbonate is preferably not effected during the laminating. Films comprising polycarbonate therefore preferably alternate with films comprising polyvinyl chloride and/or adhesive layers, in particular in order to achieve a stable bond.

With respect to the transmission properties, preferably in the wavelength range visible to the human eye, the sequences with the following structure are conceivable in particular:

optional transparent fourth laminating film of the one or more further laminating films
transparent second laminating film
opaque first laminating film, which is preferably printed on
transparent first laminating film of the one or more further laminating films
optional transparent third laminating film of the one or more further laminating
films
or
transparent second laminating film
transparent first laminating film
opaque first laminating film of the one or more further laminating films, which is preferably printed on
transparent second laminating film of the one or more further laminating films
transparent third laminating film of the one or more further laminating films.

One or more laminating films of the one or more additional laminating films, which are preferably transparent and/or made of polyvinyl chloride, are possible here, preferably on the outermost sides.

With respect to the transparency and/or the sequence of the plastic materials, in particular a symmetrical sequence is possible, preferably with regard to the first laminating film and/or the first laminating film of the one or more further laminating films.

As an advantage of a symmetrical sequence of the plastic materials, it has transpired in particular that the laminated body has a small degree of distortion and a high quality of the decorative plies. For example, a high register accuracy can be achieved hereby and the protection against forgery is increased.

However, an asymmetrical sequence is also possible. Here, at least the outermost films of the laminated body preferably comprise polyvinyl chloride.

The decorative plies, in particular the decorative ply, the further decorative ply and/or the additional decorative ply, are preferably not used here to determine the above-named sequence of the plastic materials and/or the transmission property, or are not taken into account in the above-named sequences. The advantages of the above-named sequences thus also apply in the case of a sequence of the materials which is asymmetrical overall, if the materials of the decorative plies are also taken into account.

A further conceivable sequence, in particular with regard to the plastic materials of the laminating films, is for example:

second laminating film made of PVC
first laminating film made of PC
first laminating film of the one or more further laminating films made of PVC
third laminating film of the one or more further laminating films made of PVC.

One conceivable sequence, in particular with regard to the transmission properties, preferably in the wavelength range visible to the human eye, of the laminating films, is for example:

transparent second laminating film
transparent first laminating film
opaque first laminating film of the one or more further laminating films, which is preferably printed on
transparent third laminating film of the one or more further laminating films A further conceivable sequence, in particular with regard to the plastic materials of the laminating films, is for example:

second laminating film made of PVC
first laminating film made of PC
first laminating film of the one or more further laminating films made of PVC
second laminating film of the one or more further laminating films made of PC
third laminating film of the one or more further laminating films made of PVC.
a first laminating film of the one or more additional laminating films made of PC
a second laminating film of the one or more additional laminating films made of PVC.

In particular, it is possible here for the third laminating film of the one or more further laminating films to be single- or multi-layered. In particular, it has proved to be advantageous that the third laminating film of the one or more further laminating films has one or more layers made of polyvinyl chloride and/or acts as adhesion promoter between the second laminating film of the one or more further laminating films made of polycarbonate and the first laminating film of the one or more additional laminating films made of polycarbonate.

One conceivable sequence, in particular with regard to the transmission properties, preferably in the wavelength range visible to the human eye, of the laminating films, is for example:
transparent second laminating film
transparent first laminating film
opaque first laminating film of the one or more further laminating films, which is preferably printed on
transparent second laminating film of the one or more further laminating films
transparent third laminating film of the one or more further laminating films
transparent first laminating film of the one or more additional laminating films.
transparent second laminating film of the one or more additional laminating films.

In particular, advantages result from having at least two exterior films made of polyvinyl chloride with at least one film made of polycarbonate arranged between the films made of polyvinyl chloride. Through a corresponding laminated body, the advantages of laminated bodies consisting entirely of polycarbonate and the advantages of laminated bodies consisting entirely of polyvinyl chloride can be combined. In particular, as the production methods are identical or similar to the production of laminated bodies consisting entirely of polycarbonate, this makes it possible for manufacturers, in particular card manufacturers, to make use of the advantages of laminated bodies made of polycarbonate without having to change to polycarbonate processes. The productivity can hereby be preserved, as the process cycle is typically shorter in the case of laminated bodies made of polyvinyl chloride than in the case of laminated bodies made of polycarbonate. Furthermore, savings can be made on material and/or energy costs, in particular compared with laminated bodies consisting entirely of polycarbonate. A particularly cost-effective and, with respect to the energy resources used, environmentally friendly production process is hereby possible. In particular through the first laminating film and/or the second laminating film of the one or more further laminating films made of polycarbonate, the mechanical stability of the laminated body is improved, with the result that for example security elements applied, which have an optically variable element, appear particularly brilliant.

A detachment layer and/or a protective layer are advantageously arranged on an outermost side of the decorative ply, the further decorative ply and/or the additional decorative ply, which preferably faces away from the radiation-curable adhesive layer, the further radiation-curable adhesive layer and/or the additional radiation-curable adhesive layer. The detachment layer and/or protective layer herewith preferably form an outermost layer of the decorative ply, the further decorative ply and/or the additional decorative ply and/or, in particular when several successive films comprising the first laminating film with the one or more first partial regions with the decorative ply and the at least one second laminating film are laminated to form the laminated body, is joined to, in particular brought into direct contact with and/or joined in a material-bonding manner to and/or laminated together with, a laminating film which comprises polyvinyl chloride, in particular the first laminating film, the at least one second laminating film, one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films.

It is thus expedient that at least one outermost layer of the decorative ply, the further decorative ply and/or the additional decorative ply, in particular the detachment layer and/or the protective layer of the decorative ply, the further decorative ply and/or the additional decorative ply, has a softening temperature below or in the region of that of the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films which comprise polyvinyl chloride, and/or is softened below or in the region of the laminating temperature.

The softening temperature of at least one outermost layer of the decorative ply, the further decorative ply and/or the additional decorative ply, in particular the detachment layer and/or the protective layer of the decorative ply, the further decorative ply and/or the additional decorative ply, preferably measured according to test method VICAT A (10 N), particularly preferably at a heating rate of 50 K/h, here preferably lies in the region of the softening temperature of polyvinyl chloride and/or is greater than 60° C., preferably greater than 80° C., particularly preferably greater than 100° C.

It is hereby possible for a good bond of the outermost layer of the decorative ply, the further decorative ply and/or the additional decorative ply, in particular the detachment layer and/or the protective layer of the decorative ply, the further decorative ply and/or the additional decorative ply, with a laminating film which comprises polyvinyl chloride, in particular with the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, to be able to be guaranteed.

The outermost layer of the decorative ply, the further decorative ply and/or the additional decorative ply, in particular the detachment layer and/or the protective layer of the decorative ply, the further decorative ply and/or the additional decorative ply, advantageously protects the decorative ply, the further decorative ply and/or the additional decorative ply in which the detachment layer and/or protective layer is arranged, with the result that in particular the optical effects are preserved and in particular a good process reliability, as well as a high level of protection against forgery, is guaranteed.

It is also possible for the adhesive layer, in particular the radiation-curable adhesive layer, the further radiation-curable adhesive layer and/or the additional radiation-curable adhesive layer, to be softened at a softening temperature in the range of from 50° C. to 150° C., in particular in the range of from 60° C. to 140° C., and/or for the softening temperature of the adhesive layer, preferably the radiation-curable adhesive layer, the further radiation-curable adhesive layer and/or the additional radiation-curable adhesive layer, in particular at a heating rate of 50 K/h, preferably measured according to test method VICAT A (10 N), to lie in the range between 50° C. and 150° C., preferably between 70° C. and 120° C., particularly preferably between 80° C. and 110° C.

By the softening temperature, in particular the softening temperature according to VICAT A and/or according to VICAT B, is meant the VICAT softening temperature VST (Vicat Softening Temperature) according to DIN EN ISO 306 (precursor: DIN 53460).

Here, a penetrating needle (with a circular area of 1 mm$^2$) is used for the measurement. This is loaded with a test force of 10 N (VICAT A) or 50 N (VICAT B). The test piece has an admissible thickness of from 3 mm to 6.4 mm and is heated, in particular exposed to a defined heating rate of 50 K/h or 120 K/h, respectively. The VST is reached when the penetrating body reaches a penetration depth of 1 mm.

Through variation of the boundary conditions, four combinations of parameters preferably result: VST/A/50, VST/A/120, VST/B/50, VST/B/120.

"A" represents a test load of 10 N,
"B" represents a test load of 50 N,
50 or 120 preferably represents the heating rate in [K/h].

The laminating temperature, i.e. in particular the desired process temperature which prevails inside the laminated body during the laminating process, in particular lies above the softening temperature of polyvinyl chloride and in particular below the softening temperature of polycarbonate. The laminating temperature is in particular the maximum temperature reached and desired inside the laminated body during the laminating process.

Furthermore, it is possible for the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, to comprise polycarbonate and to have a softening temperature, preferably according to VICAT B (50 N), in particular at a heating rate of 50 K/h, greater than 100° C., preferably greater than 120° C., particularly preferably greater than 140° C.

It is also possible for the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, to comprise polyvinyl chloride and to have a softening temperature, preferably according to VICAT A (10 N), in particular at a heating rate of 50 K/h, greater than 60° C., preferably greater than 80° C., particularly preferably greater than 100° C., and/or to have a softening temperature, preferably according to VICAT B (50 N), in particular at a heating rate of 50 K/h, greater than 50° C., preferably greater than 80° C., particularly preferably greater than 100° C.

In particular the adhesive force between a laminating film made of PVC and a laminating film made of PC will be described in the following.

The adhesive force, in particular according to a peel test, at a boundary surface between the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, which comprise polyvinyl chloride, and the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, which comprise polycarbonate, preferably lies in the range of from 1 N/cm to 50 N/cm, preferably in the range of from 3.5 N/cm to 30 N/cm, particularly preferably in the range of from 10 N/cm to 25 N/cm.

In particular the adhesive force between a laminating film made of polycarbonate and a decorative ply will be described in the following.

The adhesive force, in particular according to a peel test, at a boundary surface between the decorative ply, the further decorative ply and/or the additional decorative ply, in particular the radiation-curable adhesive layer, the further radiation-curable adhesive layer and/or the additional radiation-curable adhesive layer, and the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, which comprise polycarbonate, preferably lies in the range of from 1 N/cm to 30 N/cm, preferably in the range of from 2 N/cm to 20 N/cm, particularly preferably in the range of from 3 N/cm to 15 N/cm and/or is preferably greater than 2 N/cm, further preferably greater than 3.5 N/cm, and/or in particular lies in the range of from 4 N/cm to 5 N/cm.

The above ranges further preferably describe the adhesive force between a decorative ply and a laminating film comprising polycarbonate in direct contact with this decorative ply. It is also possible for the contact to be produced via an adhesive layer, in particular the radiation-curable adhesive layer and/or the further radiation-curable adhesive layer and/or the additional radiation-curable adhesive layer.

In particular the adhesive force between a laminating film made of polyvinyl chloride and a detachment layer and/or protective layer of a decorative ply will be described in the following.

In particular, the adhesive force, in particular according to a peel test, at a boundary surface between the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, which comprise polyvinyl chloride, and the decorative ply, the further decorative ply and/or the additional decorative ply, in particular the detachment layer and/or protective layer of the decorative ply, the further decorative ply and/or the additional decorative ply, is greater than 1 N/cm, preferably greater than 2 N/cm, particularly preferably greater than 3 N/cm, and/or is preferably greater than 3.5 N/cm, and/or in particular lies in the range of from 4 N/cm to 15 N/cm.

In the following it is described in particular that the adhesive force between a laminating film made of polyvinyl chloride and a laminating film made of polycarbonate is greater than the adhesive force between a decorative ply and a laminating film made of polyvinyl chloride and/or is greater than the adhesive force between a decorative ply and a laminating film made of polycarbonate and/or is greater than the adhesive force between two plies and/or layers of a decorative ply.

It is furthermore possible for the adhesive force, in particular according to a peel test, at a boundary surface between the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, which comprise polycarbonate, and the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, which comprise polyvinyl chloride, to be greater than the adhesive force at a boundary surface between the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, and the decorative ply, the further decorative ply and/or the additional decorative ply, which are preferably joined to the corresponding laminating films, and/or to be greater than the adhesive force at a boundary surface between two plies and/or layers of the decorative ply, the further decorative ply and/or the additional decorative ply, which are preferably joined to the corresponding laminating films.

It is also possible for the adhesive force, in particular according to a peel test, at a boundary surface between the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, and the decorative ply, the further decorative ply and/or the additional decorative ply, which are preferably joined to the corresponding laminating films, to be greater than the adhesive force at a boundary surface between two plies and/or layers of the decorative ply, the further decorative ply and/or the additional decorative ply, which are preferably joined to the corresponding laminating films.

By the corresponding laminating films is meant in particular the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, which comprise polycarbonate and/or polyvinyl chloride.

It is hereby achieved in particular that an attempt to dig out a decorative ply will result in a tearing open of the decorative ply. This is advantageous for example for the case where the decorative ply forms a security feature, because forgery activities are thereby made more difficult and thus in particular the protection against forgery is increased.

A boundary surface is preferably also a surface which is arranged where a boundary surface was arranged immediately before the joining of two plies.

By a peel test is preferably meant a measurement method according to ISO/IEC 10373-1, paragraph 5.3. In particular, an optionally pre-conditioned card is cut into test strips 10 mm wide.

For example, all plies on one side of a decorative ply are then removed, preferably with a length of from 5 mm to 10 mm. Thus, for example, with a sharp blade, the laminating films over a decorative ply, in particular a security feature, preferably a KINEGRAM®, are stripped off the core, i.e. in particular stripped off a laminating film and the decorative ply, which in particular forms the security feature, preferably forms the KINEGRAM®. The stripping expediently takes place only partially.

The stripped-off end is then preferably secured to the holder of a tensile testing machine via a holding clamp or by means of an adhesive tape. A right angle is preferably produced between the stripped-off laminating films secured to the tensile testing machine and the laminating films not stripped off. In particular, a right angle is produced between the first laminating film and the second laminating film. The bottom of the card, in particular the first laminating film of the one or more further laminating films, is expediently optionally fixed on a stabilizing plate.

During the tensile measurement, the detached film layer, for example thus at least the first laminating film with the corresponding decorative ply and the first laminating film of the one or more further laminating films, is preferably guided over a roller. The adhesive force (peel strength) is preferably plotted on a graph and then evaluated, wherein the first and last 5 mm of the measurement are preferably not taken into account. The results are given for example in N/10 mm.

It is also possible for the measurement to be carried out at locations without decorative ply, for example in order to measure the adhesive force between a laminating film comprising polycarbonate and a laminating film comprising polyvinyl chloride.

Furthermore, it is possible for the following steps to be carried out, preferably during and/or before the laminating of several successive films comprising the first laminating film with the one or more first partial regions with the decorative ply and the at least one second laminating film to form the laminated body:

providing a hinge,
joining, in particular laminating, the hinge and the first laminating film, the at least one second laminating film and/or one or more laminating films of the one or more further laminating films, in particular the first, second, third and/or fourth laminating film of the one or more further laminating films, and/or one or more laminating films of the one or more additional laminating films, in particular the first and/or second laminating film of the one or more additional laminating films, wherein the hinge is preferably arranged between the second laminating film and the first laminating film of the one or more further laminating films and/or is arranged between the third laminating film of the one or more further laminating films and/or the second laminating film of the one or more additional laminating films and the fourth laminating film of the one or more further laminating films and/or the second laminating film, and in particular wherein the hinge, preferably when viewed perpendicular to a plane spanned by the first laminating film and/or by the second laminating film of the one or more further laminating films, is arranged next to the first laminating film and/or the second laminating film of the one or more further laminating films and/or the first laminating film of the one or more additional laminating films.

It is expedient here that the hinge is provided at least with one ply made of polyvinyl chloride, made of thermoplastic polyurethane and/or made of a fabric tape, wherein the hinge preferably has been and/or is coated with polyvinyl chloride, in particular with the result that during the joining, in particular during the laminating, of the hinge the polyvinyl chloride is joined directly to the adjacent laminating films, layers and/or plies, in particular is joined in a material-bonding manner.

A hinge is preferably a part which produces a join between the laminated body and further, preferably planar, bodies. For example, the hinge is a part which produces a join of the laminated body as data page, preferably as a passport card of a passport booklet, to the seam of the passport booklet, which in particular has a hard cover, and preferably to the rest of the pages of the passport booklet. In particular, the data page is thus sewn into the passport booklet by means of the "hinge", i.e. preferably via a flexible narrow strip on the laminated body or on the data page, wherein the hinge acts as joining element and as flexible hinge in the seam region of the passport booklet. Textile, in particular woven textile or non-woven textile, hinges and/or non-textile hinges made of PVC and/or TPU (TPU=thermoplastic polyurethane) and/or TPE (TPE=thermoplastic elastomers) are preferably used, which are in particular formed over the whole surface and/or have through holes.

It is possible for example here for the hinge to be arranged next to the first laminating film and/or the second laminating film of the one or more further laminating films and/or the first laminating film of the one or more additional laminating films, wherein hinge and second laminating film and/or fourth laminating film of the one or more further laminating films and/or hinge and first laminating film and/or third laminating film of the one or more further laminating films and/or second laminating film of the one or more additional laminating films preferably overlap at least partially and/or are in direct contact. It is furthermore possible for the hinge and the first laminating film and/or the hinge and the second laminating film of the one or more further laminating films and/or first laminating film of the one or more additional laminating films to be in direct contact and/or not to be in direct contact.

It has furthermore proved to be advantageous if the first and/or second surface of the first and/or second laminating film has a gloss level at an angle of 60° according to ESAO 2813 of more than 90%, preferably of more than 98%. Tests have shown that such a choice of the gloss level ensures that optical and/or mechanical disturbances in the decorative ply are further minimized during the laminating.

To achieve a suitable, in particular sufficiently smooth, surface for achieving a clean print result, it can be advantageous to pre-treat a surface that is too rough. For this, thinly applied adhesive layers and/or primer layers and/or adhesion-promoter layers and/or pre-embossings applied by means of hot stamping or cold stamping and/or e.g. a thermal treatment and/or a calendering could be suitable. Such coats or treatments could also be applied registered relative to the decorative ply, whereby the properties of the laminate in the decoration-free regions are not affected.

It is furthermore advantageous if the radiation-curable adhesive layer is dyed, in particular is dyed translucently in particular with dyes or pigments. It is hereby possible to produce additional optical effects by means of the radiation-curable adhesive layer. Effect pigments can also be introduced, which fluoresce for example under UV irradiation or reflect in a different wavelength under IR irradiation.

It is furthermore advantageous if some of the first regions of surface are determined by printing of the adhesive layer onto the first laminating film and some of the first regions of surface are determined by printing of the adhesive layer onto the transfer film. The adhesive layers can have different properties, such as for example have different mechanical properties after the curing or different or also no pigments and dyes. Different properties can thereby be produced registered relative to parts of the transfer plies partially transferred in first regions of surface.

The one or more first partial regions can be arranged in the form of one or more motif regions, wherein these motif regions are preferably delimited by an imaginary and/or visible outline. Any desired number of first regions of surface and second regions of surface can be arranged within a motif region.

The one or more motif regions here preferably have one or more motifs formed in the decorative ply. The decorative ply is preferably formed transparent in the respective one or more first partial regions outside the one or more motifs. By transparent is preferably meant here a transparency in the wavelength range visible to the human observer of more than 80%, preferably more than 90%.

The at least one transfer film preferably has a detachment layer, which is arranged between the carrier film and the decorative ply, By means of these detachment layers, the detachment force between the carrier film and the decorative ply can be set in a targeted manner, with the result that a particularly high resolution and edge sharpness with respect to the transferred regions of the decorative ply can be achieved.

The detachment layer is preferably part of the transfer plies which are transferred. The detachment is preferably ensured by one or more thin wax layers (thickness range 0.01-0.2 micrometers) between carrier film and detachment layer, with the result that the detachment layer can be detached from the carrier ply. The detachment layer can in particular be formed in such a way that it ensures a good adhesion to the second laminating film in the laminating body. The decorative ply preferably has one or more decorative layers. The decorative layers are present here either over the whole surface or partially in the decorative ply.

The one or more decorative layers are preferably one or more of the following layers:

An "HRI layer" (HRI=High Refractive Index) can be used as decorative layer. An HRI layer is a dielectric layer with a comparatively high refractive index, which is highly refractive and typically largely transparent in the visible wavelength range of from 400 nm to 700 nm, Such HRI layers preferably have a refractive index which is higher than 1.6, preferably higher than 1.8. Such an HRI layer can consist for example of ZnS or $TiO_2$ or $SiO_x$, which are applied using a vacuum vapor deposition method. Highly refractive polymer layers, in particular enriched with nanoparticles, are also possible. Such polymer layers can be printed on and/or vapor-deposited.

The decorative layer can be a metal layer, for example made of aluminum (Al), silver (Ag) or copper (Cu) or chromium (Cr). This metal layer can here be provided in the decorative ply as an opaque metal layer, translucent metal layer or transparent metal layer. The transparency of the metal layer can here be set through a corresponding choice of the layer thickness of the metal layer and/or through corresponding rasterization of the metal layer. Furthermore, it is also possible for the decorative ply to have several metal layers made of different materials and/or with different transparency.

The decorative layer can be a varnish layer which contains dyes and/or pigments. Here, the decorative ply can contain different such varnish layers which in particular contain different dyes and/or pigments. These varnish layers can be arranged one over another and/or next to each other. The dyes and/or pigments here can furthermore also be luminescent and/or phosphorescent dyes and/or pigments. In particular, the use of transparent or translucent or opaque optically variable pigments, for example thin-film layer pigments or liquid crystal pigments with a color change effect, which can in particular also be varied with respect to their alignment by means of a magnetic and electric field and thus can produce complex optically variable effects, is furthermore advantageous. Furthermore, the use of thermochromic and/or electrochromic dyes and/or pigments in the decorative layers is also advantageous.

The decorative layer can furthermore also consist of an electrically conductive layer or magnetic layer. Such layers consist of an electrically conductive material and/or a magnetic material, for example of a metallic material, of an electrically conductive polymer or electrically conductive or magnetic pigments or particles incorporated in a binder matrix.

The decorative layer can be a volume hologram layer, for example a photopolymer layer, into which a transmission and/or reflection hologram has been imprinted using a hologram master.

The decorative layer can be a relief layer with a surface relief introduced, in particular molded, therein.

This relief layer preferably consists of a thermoplastic and/or UV-curable plastic, into which a corresponding surface relief is molded in particular by means of a replication tool by means of thermal replication and/or UV replication. The surface relief can also have been introduced by means of lasers. The relief layer can also be a photosensitive layer, into which the surface relief is introduced by means of exposure to light, by exposing the relief layer to a pattern of varying luminosity and then, depending on the type of photosensitivity, washing away or dissolving the exposed or unexposed regions of the relief layer, in particular by means of solvents.

The relief layer is preferably not softened during the laminating of several successive films comprising the first laminating film with the one or more first partial regions with the decorative ply and the at least one second laminating film to form the laminated body. In particular, the softening temperature of the relief layer lies above the laminating temperature. The softening temperature of the relief layer, preferably measured according to test method VICAT A (10 N), in particular at a heating rate of 50 K/h, is preferably greater than 60° C., preferably greater than 100° C., particularly preferably greater than 130° C.

It is hereby possible for the relief layer and in particular the structures molded into the relief layer to remain stable during the laminating. Here, for example, the brilliance of the decorative ply is preserved, for example by a relief structure molded therein being preserved, which guarantees in particular a high level of protection against forgery.

Preferably, one of the following surface reliefs or a combination of two or more of the following surface reliefs is provided here as surface relief:

diffractive surface relief, holographic surface relief, first-order diffraction grating, zero-order diffraction structure, blazed grating, achromatic surface relief, surface relief in the form of a lens and/or a lens raster, an arrangement of micromirrors, microprisms, microfacets or a freeform surface, matte structure, in particular isotropic or anisotropic matte structure.

The relief layer here preferably has different partial regions, into which different surface reliefs are molded, which differ in particular in one or more relief parameters and/or consist of different ones of the above-listed surface reliefs. Several of the above-listed surface reliefs can also overlie each other.

The decorative ply furthermore preferably has one or more adhesion-promoting layers and/or barrier layers and/or stabilizing layers and/or protective layers. These layers can here likewise be present in the decorative ply over the whole surface or partially.

The stabilizing layer is preferably only very slightly softened during the laminating of several successive films comprising the first laminating film with the one or more first partial regions with the decorative ply and the at least one second laminating film to form the laminated body. In particular, the softening temperature of the stabilizing layer lies above the laminating temperature. The softening temperature of the stabilizing layer, in particular at a heating rate of 50 KM, preferably measured according to test method VICAT A (10 N), is preferably greater than 60° C., preferably greater than 100° C., particularly preferably greater than 130° C.

It is hereby possible for the stabilizing layer to remain stable during the laminating of several successive films comprising the first laminating film with the one or more first partial regions with the decorative ply and the at least one second laminating film to form the laminated body. In particular, the brilliance of the decorative ply can be preserved here.

The decorative ply can have in particular a combination of at least one layer applied over the whole surface and at least one partially formed layer. For example, the layer formed over the whole surface can be a transparent protective layer and/or an in particular transparent stabilizing layer and/or an in particular transparent adhesion-promoter layer and/or a transparent or translucent HRI layer. The partially formed layer can in particular form at least one motif in the form of a pattern and/or a graphic and/or a code and/or of one or more alphanumeric characters. For example, the at least one partially formed layer can be a metal layer and/or a color layer and/or an HRI layer.

The layers of the decorative ply formed over the whole surface are preferably transparent overall and formed such that they overlap the partially formed layers completely and on all sides.

The respective motif in at least one, preferably in all, planar dimensions is preferably formed smaller than the respective motif region of the radiation-curing adhesive layer.

The decorative ply is preferably applied to the radiation-curing adhesive layer such that the motif region of the radiation-curing adhesive layer protrudes beyond the motif of the decorative ply in at least one planar dimension, but preferably on all sides. This means that in the respective motif region the complete motif is transferred as well as regions of surface of the decorative ply formed transparent and protruding beyond it. These regions of surface formed transparent are essentially no longer to appear, in particular optically, after the transfer of the decorative ply, and thus the motif is to be transferred practically without a visible edge.

Preferably, not just one transfer film and/or radiation-curable adhesive, but two or more transfer films and/or radiation-curable adhesives are used during the production of the laminating inlay or the laminated body. The above-described steps of applying and peeling off the at least one transfer film and optionally printing a radiation-curable adhesive are thus preferably repeated several times. It is hereby possible to combine different optical effects, which are provided by different decorative plies of different transfer films and/or different radiation-curable adhesives, with each other efficiently and cost-effectively in the laminating inlay or the laminated body, without having to consider the different application processes required in each case.

The decorative plies of different transfer films can here be provided on the first laminating film next to each other, partially overlapping or completely overlapping.

It is thus advantageous to provide two or more transfer films as at least one transfer film, to apply the two or more transfer films to the first surface of the first laminating film and to peel them off the first laminating film, with the result that in the one or more first partial regions the decorative ply of at least one of the two or more transfer films is detached from the respective carrier film and remains on the first surface of the first laminating film. The radiation-curable adhesive can here be printed onto the first surface of the laminating film in respectively allocated one or more first zones at the same time or in succession. The laminating films can then be applied to the first surface of the first laminating film at the same time or in succession. The carrier films of the transfer film can then be peeled off at the same time and in succession. Furthermore, it is also possible to print the adhesive layer for two or more transfer films onto the first surface of the first laminating film and then to apply this transfer film to the first surface of the laminating film at the same time or in succession.

It is particularly advantageous here if the two or more first transfer films have different decorative plies from each other, which differ in particular in relation to the decorative layers present or the molding of the decorative layers. Thus, for example, a first transfer film can have a decorative ply with a varnish layer containing pigments and/or dyes, in particular optically variable pigments and/or dyes and a second transfer film can have a relief layer with an introduced diffractive relief structure and an HRI layer. Furthermore, a third transfer film can have for example a decorative layer containing one or more semi-transparent and/or opaque metal layers, in particular molded patterned. The third transfer film can also additionally have a relief layer with an introduced diffractive relief structure.

It is advantageous here if not only one first partial region, but a group comprising two or more first partial regions, in particular a plurality of first partial regions are detached from the respective transfer films, and to transfer such groups of first partial regions of different decorative plies to the first laminating film next to each other and/or overlapping. These two or more groups of first partial regions here preferably form partial motifs of a total motif or repeat an item of information in different optical designs. The items of information produced by means of different decorative plies are hereby "interwoven" with each other and the protection against forgery is hereby further improved.

Furthermore, it is advantageous to print one or more coats, in particular register marks, varnish layers, color layers, layers containing pigments and/or dyes, in particular optically variable pigments, luminescent substances and/or electrically conductive or magnetic coats, on the first and/or the second surface of the first and/or second laminating film and/or the decorative layer. The protection against forgery can hereby be further improved.

Furthermore, it is also possible for the laminating film already to have various features, such as for example further applied transfer plies and/or overprints and/or openings and/or perforations and/or markings, which were applied in preceding work steps, before the transfer of the decorative plies. A registered application of the decorative plies by means of radiation-curing adhesive relative to these features is particularly advantageous.

Furthermore, it is also possible for various features, such as for example further applied transfer plies and/or overprints and/or openings and/or perforations and/or markings, to be applied to and/or introduced into the laminating film in subsequent work steps after the transfer of the decorative plies. A registered application of these features relative to the decorative plies is particularly advantageous.

It is furthermore advantageous to carry out one or more of the following steps during the production of the laminated body or the laminating film:
  cleaning the first surface of the first and/or second laminating film, in particular before printing of the radiation-curable adhesive, before the laminating or before the application of the transfer film,
  introducing perforations into the first surface of the first and/or second laminating film and/or the decorative layer,
  surface-treating the first surface of the first and/or second laminating film and/or the decorative layer, in particular by means of corona treatment and/or plasma treatment, in particular before the printing of the radiation-curable adhesive layer or before the laminating method is carried out,
  annealing the laminated body, the first laminating film, the second laminating film or the laminating inlay,
  finishing and/or cutting the laminated body, the first laminating film and/or the second laminating film.

BRIEF DESCRIPTION OF THE DRAWINGS

In the following, the invention is explained by way of example with reference to several embodiments utilizing the attached drawings.

DETAILED DESCRIPTION OF THE PREFERRED EMBODIMENTS

Figure 1:
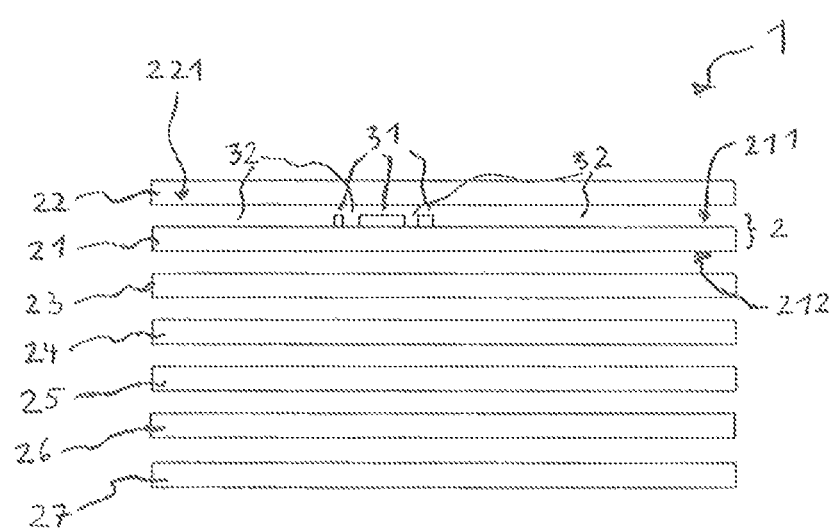
FIG. 1 shows the schematic structure of a laminated body.

FIG. 1 shows the basic layer structure of a laminated body 1. The laminated body 1 is formed in particular in the form of a card, for example a bank card, identity card or credit card or banknote or a security document, for example an insert page of a passport booklet.

The laminated body 1 has several successive films, which are laminated to form the laminated body by means of a laminating method. Of these films, several laminating films 22 to 27 and a laminating inlay 2 are shown by way of example in FIG. 1.

The laminating inlay 2 has a laminating film 21 with a first surface 211 and a second surface 212 opposite it. At least one decorative ply detached from a carrier film of at least one transfer film and a radiation-curable adhesive layer, which is at least partially cured, arranged between the decorative ply and the first surface 211 of the laminating film 21 are provided in first partial regions 31 on the first surface 211 of the laminating film 211. In second partial regions 32 the at least one decorative ply is not provided on the first surface 211 of the laminating film 21 and is peeled off with the carrier film.

The laminating films 21 to 27 preferably consist in each case of a thermoplastic film, and they at least partially fuse under the conditions of the laminating method used, with the result that during the laminating method the surfaces of the laminating films lying one on top of another are fused to each other at least over part of the surface, preferably over the whole surface. A corresponding intimate layer bond between the layers of the laminated body 1 is hereby achieved, which leads to a particularly high level of protection against forgery as well as resilience vis-à-vis environmental influences.

At least some of the laminating films 21 to 27, preferably all of the laminating films 21 to 27, here preferably consist of polycarbonate. The laminating body 1 thus preferably has polycarbonate as main constituent. Such a laminating body is characterized by a particularly high resistance to scratching, wear and chemicals and a particularly good inter-layer adhesion, and thus has a much better fitness for use compared with usual security documents. However, it is furthermore also possible for one or more of the laminating films 21 to 27 to consist of another plastic material, for example of PET, PET-G, ABS or PVC.

The laminating films 21 to 27 preferably have a layer thickness of between 30 µm and 400 µm, in particular between 40 µm and 130 µm.

Thus; for example, the laminating films 21, 22, 23 and 27 in each case consist of a polycarbonate film with a layer thickness of 50 µm, the laminating films 24 and 26 consist of a multi-layered plastic film with a layer thickness of 150 µm and the laminating film 25 consists of a multi-layered laminating film, for example with a layer thickness of 350 µm, in which still further security features, for example a transponder chip and/or an antenna, which are integrated for contactless data communication.

Furthermore, it is also possible for one or more of the laminating films 21 to 27 to be printed on over part of the surface or to be provided with an adhesion-promoting layer, which further improves the inter-layer adhesion to the neighboring laminating film, on the respective surfaces. A corona and/or plasma treatment can alternatively or additionally have been carried out on the respective surface to improve the inter-n layer adhesion.

The laminating films 22 to 27 and the laminating inlay 2 are applied to each other for example in the sequence of layers shown in FIG. 1 and then laminated to form the laminated body 1 using heat and pressure. The laminating method to be used and the pressure and temperature to be used in the process are to be chosen here depending on the sequence of layers and the structure of the laminating films 21 to 27. A laminating method in which the sequence of layers shown in FIG. 1 is inserted between two heated rollers of a roll laminator or between the heated plates of a lifting press and, for example in the case of polycarbonate (PC), laminated to form the laminated body 1 by means of a pressure of from 10 N/cm$^2$ to 400 N/cm$^2$, preferably 40 N/cm$^2$ to 200 N/cm$^2$ and a temperature of more than 150° C., preferably between 160° C. and 210° C., is preferably used here. Other materials, such as for example PVC, can have settings deviating from this.

As shown in FIG. 1, the laminating inlay 2 here is arranged in stacks of layers fed to the laminator in such a way that the first partial regions 31 with the decorative ply and the radiation-curable adhesive layer are provided between the laminating film 21 and the laminating film 22. Furthermore, preferably, as shown in FIG. 1, no further layers are provided between the two laminating films 21 and 22 in second partial regions 32, with the result that the opposing surfaces can touch the laminating films 21 and 22 in the second partial regions 32 during the laminating and thus the surfaces of the laminating films 21 and 22 are preferably fused to each other in the second partial regions 32. For the fusing of the laminating films 21 and 22, the decorative ply or decorative plies provided in the first partial regions 31 and the radiation-curable adhesive layer provided there are furthermore sunk into the laminating films 21 and 22, and thus preferably embedded in a monolithic body consisting of polycarbonate. During this process, the at least one decorative ply is protected from degradation and in particular too great a deformation by the radiation-curable adhesive layer.

As already stated above, it is hereby made possible to insert decorative layers which have a low inherent stability, or in which the optical effects realized by them are particularly susceptible to the pressure and temperature loads occurring in the laminating method, into the at least one decorative ply.

The area ratio of the one or more first partial regions 31 to the sum of the one or more first and second partial regions 32 here is preferably not more than 80% and in particular between 3% and 80%. It is furthermore advantageous to choose the area ratio of the first partial regions 31 to the second partial regions 32 such that the adhesion between the laminating film 21 and the laminating film 22 after the laminating is more than 3.0, preferably more than 5 Nm. And this measured in particular at a peel angle of 90°, a peeling speed of 300 mm/min and a strip width of 10 mm. The first and/or second partial regions 31 and 32 here preferably have a width of 0.1 mm or more, in particular a width of 0.2 mm or more. It is furthermore advantageous if one or more of the first partial regions 31 and/or the second partial regions 32 form raster elements of a raster which preferably comprises a plurality of raster elements, preferably more than 10, further preferably more than 20 raster elements.

These measures ensure that, after the laminating, enough bonding bridges are formed between the laminating films 21 and 22 to prevent an impairment of the laminated body 1 in daily use as well as an impairment of the protection against forgery of the laminated body 1, and on the other hand to provide a decoration with good optical quality in the laminated body 1.

The laminating inlay 2 can also be used in the laminating body 1 as a cover ply, wherein the transfer plies advantageously lie on the inside and are protected by the first laminating film 21. The observer thus sees the transfer plies mirror-inverted through the adhesive layer. Several transfer plies can also be applied to different laminating films and be present at different distances from the surface of the laminating body. Likewise, laminating plies can be applied to both sides of the first laminating film 21, advantageously registered relative to each other.

Figure 2:
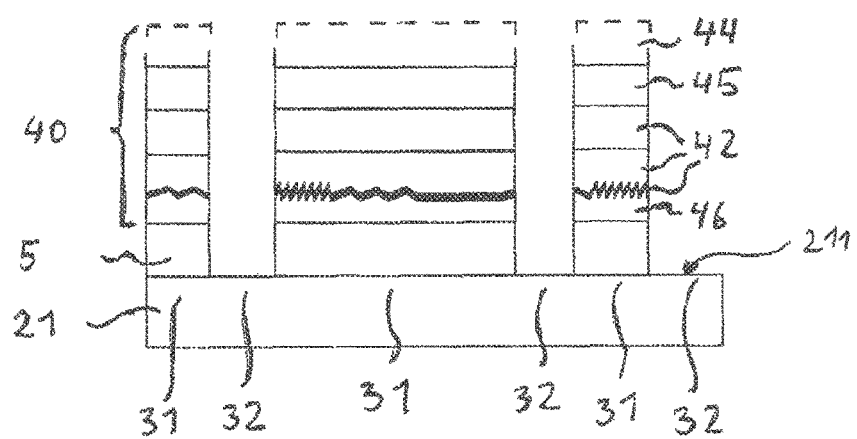
FIG. 2 shows the schematic structure of a laminating inlay.

FIG. 2 illustrates the schematic structure of the laminating inlay 2:

The laminating inlay 2 has the laminating film 21, a radiation-curable adhesive layer 5 and a decorative ply 40, which is provided in one or more first partial regions 31 and is not provided in the one or more second partial regions 32.

As represented in FIG. 2, the radiation-curable adhesive layer 5 is preferably arranged coextensive with and congruent with the decorative ply 40 in the first partial regions 31. However, it is also possible for the radiation-curable adhesive layer 5 to be arranged not absolutely coextensive with and congruent with the decorative ply 40, but to be formed with a slightly larger area or smaller area than the decorative ply 40. The radiation-curable adhesive layer 5 can thus, for example, not completely fill the partial regions 31 or also protrude slightly into the second partial regions 32.

The decorative ply 40 provided in the first partial regions 31 is detached from the carrier film of one or more different transfer films and has at least one decorative layer. In the embodiment example according to FIG. 2 the decorative ply 40 is detached from the transfer film 4 shown in FIG. 3 and has several decorative layers 42, an adhesion-promoting layer 46 and a protective layer 45 and an optional separating layer or adhesion-promoting layer 44.

The transfer film 4 has a carrier film 41 and the decorative ply 40 which is detachable from the carrier film and which has at least one decorative layer 42. In the embodiment example according to FIG. 2 and FIG. 3 the transfer film 4 furthermore also has additional optional layers, namely one or more detachment layers 43, the separating layer and/or adhesion-promoting layer 44, the protective layer 45 and the adhesion-promoting layer 46. These layers could also be dispensed with.

The carrier film 41 preferably consists of a plastic film. This plastic film preferably has a particularly low surface roughness, in particular a surface roughness of less than 0.5 µm, on its surface oriented towards the carrier ply. The carrier film 41 preferably consists of a PET film and has for example a layer thickness of between 15 µm and 200 µm, for example 19 µm.

The detachment layer 43 preferably has several thin layers, which reduce the detachment force between the decorative ply 40 and the carrier film 41. The detachment layer 43 here consists for example of one or more wax layers with respective thicknesses per wax layer in the range of from 0.05 g/m² to 0.2 g/m². The detachment layer 44 consists for example of a thin varnish layer, which is applied with an application weight of from 0.5 g/m² to 1.5 g/m². The detachment layer 44 can be transferred as part of the decorative ply 40 at least partially with it and/or remain on the carrier film 41 and be detached with it.

The separating layer and/or adhesion-promoting layer 44 additionally supports the separation of the decorative ply 40 from the carrier film 41 and/or a later overprinting of the transferred decorative ply 40.

The protective layer 45 preferably consists of a varnish layer, which is applied with a weight per unit area of from 0.7 g/m² to 2.1 g/m² and in particular contains one or more crosslinking components.

The decorative layers 42 preferably consist of one or more of the decorative layers already described above and are in each case formed partially or also over the whole surface and thus consist for example of an at least partially formed HRI layer, a metal layer, a varnish layer, a layer containing dyes and/or pigments, in particular optically variable pigments, a volume hologram layer, an electrically conductive layer, a magnetic layer and/or a relief layer with surface relief introduced.

Figure 3:
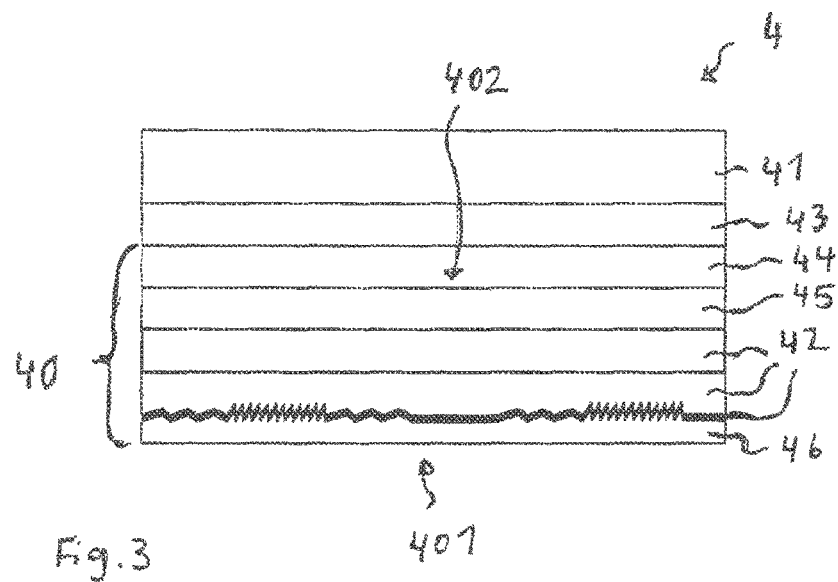
FIG. 3 shows the schematic structure of a transfer film.

In the embodiment example according to FIG. 3, for example, a relief layer is thus provided, into which, as indicated in FIG. 3, a surface relief is molded. This surface relief consists of different relief structures in regions, for example different diffractive gratings or different types of relief structures. For example, a first region with a matte structure, in particular an anisotropic matte structure, a second region with a diffraction grating, which generates primarily a first optically variable effect, a third region with a diffraction grating, which generates a color-change effect as zero-order diffraction structure for example when rotated, and a fourth region with a relief structure, which is formed as a blazed grating or microlens arrangement and generates an achromatic, optically variable effect. This decorative layer is furthermore, as also indicated in FIG. 3, underlaid for example with an HRI layer and/or metal layer as further decorative layer. The HRI layer and/or metal layer here can be formed over part of the surface or over the whole surface and can be formed transparent, semi-transparent or opaque, and thus correspondingly generate optical effects when observed in reflected light and/or when observed in transmitted light. Furthermore, above the relief layer, as decorative layer 42, a varnish layer containing dyes and/or pigments is provided, which in particular contains optically variable pigments in the form of interference layer pigments. This layer is preferably formed not over the whole surface, but partially and patterned, and can furthermore have opaque, translucent or transparent properties and thus generate corresponding optical effects coupled or de-coupled in the respective regions when viewed in reflected light or transmitted light.

The adhesion-promoting layer 46 consists for example of a primer layer, which is applied in an application weight per unit area of from 0.02 g/m² to 1.0 g/m².

As already stated above, the protective layer 45 and the adhesion-promoting layer 46 can also be dispensed with.

The decorative ply 40 has a surface 401 facing away from the carrier film 41 and a surface 402 facing the carrier film 41.

To produce the laminating inlay 2 illustrated in FIG. 2, a radiation-curable adhesive is now printed on the surface 211 of the laminating film 21 and/or the surface 401 of the decorative ply 40 of the transfer film 4. And such that the radiation-curable adhesive is applied to the respective surface 211 of the laminating film 21 and/or the surface 401 of the decorative ply in one or more first zones and forms the radiation-curable adhesive layer 5 in the one or more first zones. In contrast, the radiation-curable adhesive is not applied to the respective surface 211 of the laminating film 21 and/or 401 of the decorative ply 40 in one or more second zones.

The transfer film 4 is then applied to the surface 211 of the laminating films 21. And this such that at least one partial region of the one or more first zones, in which the radiation-curable adhesive layer 5 is not applied, is arranged between the surface 401, the decorative ply 40 and the surface 211 of the laminating film 2 in at least one partial region of the one or more first zones with the radiation-curable adhesive layer 5. Then an at least partial curing of the radiation-curable adhesive layer 5 is preferably effected, whereby the adhesion between the transfer film 4 and the laminating film 21 is clearly increased in the first zones with the radiation-curable adhesive layer 5. Then the transfer film 4 is peeled off the laminating film 21, wherein in the one or more first partial regions 31 the decorative ply is detached from the carrier film 41 when peeled off and remains on the laminating film 21, and in the one or more second partial regions 32 of the laminating film of the decorative ply 40 remains on the carrier film and is peeled off with the carrier film 41.

During the peeling, the decorative ply 40 "breaks" in the boundary region between the first and second zones, because of the different adhesive properties of the decorative ply 40 in the region of the first zones and second zones. This results in the effect, already described above, that the first zones and first partial regions 31 as well as second zones and second partial regions 32 substantially match, but slight deviations can result here because of the course of the breaking edge at the boundary lines.

Figure 4:
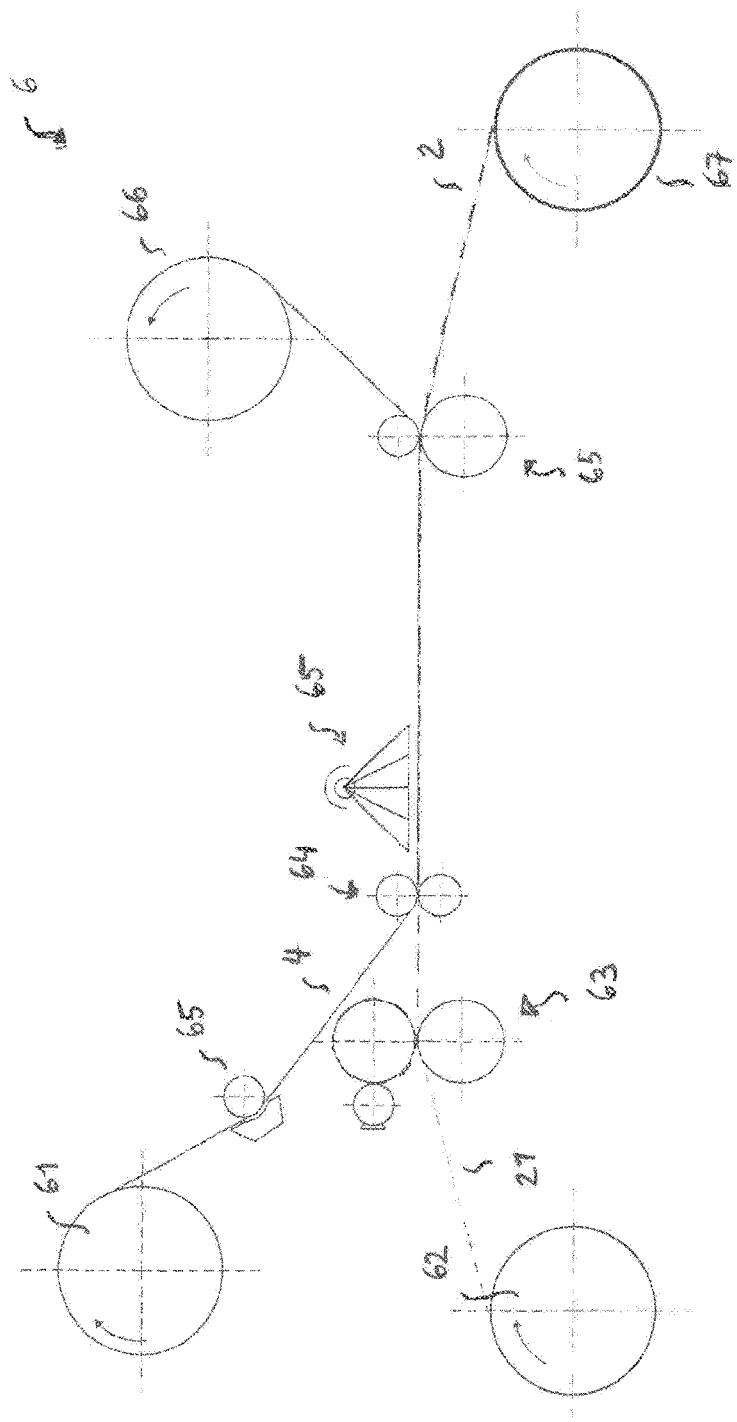
FIG. 4 shows the schematic structure of a production device for producing a laminating inlay.

The performance of this method will now be described in detail below on the basis of FIGS. 4 to 10*b*:

FIG. 4 illustrates by way of example production steps for producing a laminating inlay 2 as well as a production device 6 used for this:

The production device 6 shown in FIG. 4 has an unwinding device 61 as well as an unwinding device 62, each of which comprises a transfer film 4 or laminating film 21 wound on a supply roll as well as a drive and/or a control device, by means of which the transfer film 4 or the laminating film 21 is unwound from the supply roll.

Figure 5:
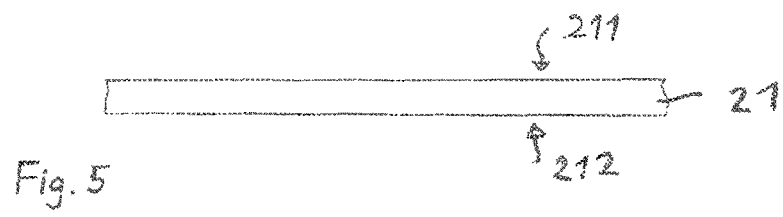
FIG. 5 shows the schematic structure of a laminating film for use in the machining device according to FIG. 4.

FIG. 5 now illustrates a section from the laminating film 211 unwound by the unwinding device 62. This has two opposing surfaces 211 and 212, as indicated in FIG. 5.

The laminating film 21 is preferably a film made of a thermoplastic, preferably a film containing polycarbonate (PC) as main constituent. The laminating film 21 thus consists for example of a polycarbonate film with a thickness of between 30 μm and 400 μm, preferably between 40 μm and 130 μm.

The laminating film 21 preferably has at least one surface, which is designed such that it allows the UV-curable adhesive to be printed with a sufficiently good print quality and, after the curing of the UV-curable adhesive, makes a good bond possible both to the decorative ply of the transfer film 4 and, in a later laminating process, to further laminating films.

By a sufficiently good print quality is meant here in particular that the lines can be printed up to 0.2 mm wide, preferably up to 0.1 mm wide, without interruptions in the line. This allows text to be produced up to a font size of 1 point, in particular up to a font size of 2 points. Furthermore, surface areas and lines must be printable in a covering manner, without holes or double edges (squeezed edges, in particular in the case of flexographic printing) or edges which smear.

In order to achieve a correspondingly good print quality, it has proved to be essential to set the surface roughness of the laminating film in a correspondingly targeted manner. For this, it has proved to be advantageous to choose the surface roughness of the laminating film 21 such that it has a roughness Ra of less than 2 μm, further preferably Ra of less than 0.8 μm.

It has furthermore proved to be advantageous to choose a surface with a gloss level which below 60° has according to ISO 2813 of more than 98.

The laminating film 21 is now fed to a printing device 63 by means of a web-guiding device, not shown. The surface 211 here is preferably correspondingly optimized, as explained above, for achieving a good print quality.

Furthermore, it is also possible to also provide one or more further machining stations before the feeding to the printing device 63. These machining stations can be for example machining stations which further improve the surface quality of the surface 211 for the subsequent machining processes. Thus, it is possible for example to provide cleaning devices here, for example cleaning brushes with compressed air support, surface-treatment devices which carry out a surface treatment by means of corona and/or plasma treatment, corresponding rolling and/or annealing devices which optimize the surface quality and in particular surface roughness, as described above, etc. Furthermore, it is also possible to provide still further printing devices, transfer devices or the like here, which apply additional register marks or decorative elements to one of the surfaces 211 and/or 212 of the laminating film 21.

The printing device 63 is preferably a flexographic printing device. However, it is also possible for this to be a gravure printing or screen printing device or to be a digital printing device, for example to be an inkjet printing device.

Figure 6A:
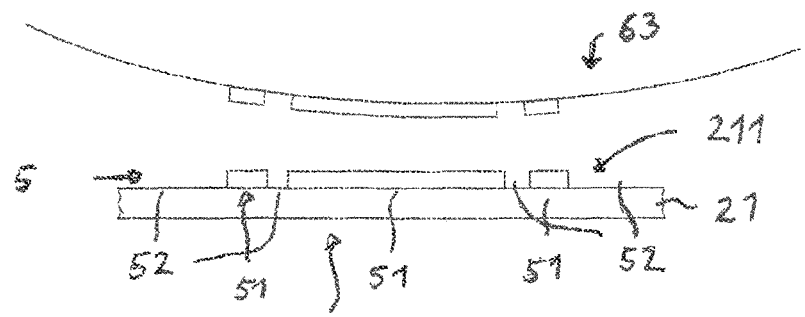
FIG. 6a and FIG. 6b illustrate, in sectional representation and in top view, a printing of a radiation-curable adhesive on a laminating film.
Figure 6B:
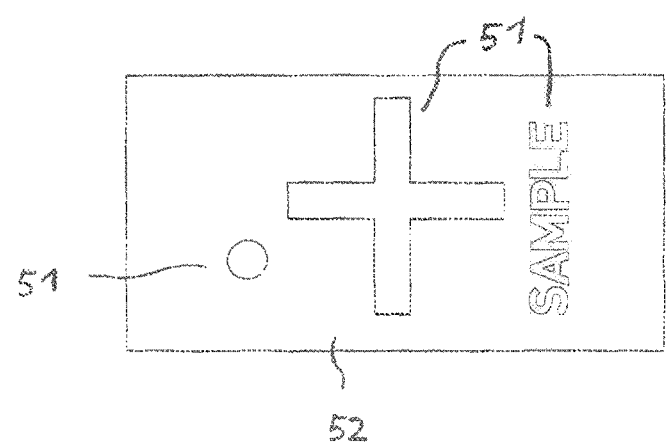

The printing of the radiation-curable adhesive on the laminating film 21 in the printing device 63 is illustrated by way of example in FIGS. 6*a* and 6*b*.

FIG. 6*a* shows a sectional representation with the laminating film 21 as well as, schematically, a section of a printing roller of the printing device 63, by means of which the radiation-curable adhesive is printed onto the surface 211 of the laminating film 21. FIG. 6*b* schematically shows a top view of a section of the laminating film 21 with the radiation-curable adhesive printed on by the printing device 63.

As shown in FIG. 6*a* and FIG. 6*b*, the radiation-curable adhesive is applied to the surfaces 211 of the laminating film 21 in one or more first zones 51 and is not applied to the surface 211 of the laminating film 21 in one or more second zones 52. The first zones 51 here are preferably, as shown in FIGS. 6*c*, 6*b*, formed in the form of patterns, letters, numbers, codes or symbols or other graphic and/or alphanumerical and/or coded motifs, and surrounded by one or more second zones 52.

As already stated above, the area ratio of the first zones 51 to the total surface area, i.e. to the sum of the first and second zones 52, is here preferably to be chosen such that it is not more than 80%. Furthermore, the dimensions of the first and/or second zones 51 and 52, and their molding and arrangement relative to each other are preferably to be formed as described above with respect to the first and/or second partial regions 31 and 32, in order thus to achieve the advantages correspondingly described there after the laminating of the laminating inlay 2 to form the laminated body 1.

Adhesives which can be cured by means of a UV radiation source or by means of e-beam (electron beam) are preferably used as radiation-curable adhesives here. These adhesives preferably contain reactive acrylates, epoxies, or enol ethers and photoinitiators. During exposure to light, the photoinitiators form radicals or reactive cations (superacids) and induce a polymerization or crosslinking reaction of longer-chain molecules. Adhesive components can be for example monoacrylates, diacrylates, triacrylates, oligomers and monomers.

Adhesives which contain photoinitiators which react to different wavelengths can furthermore also be used here as radiation-curable adhesives, with the result that the curing of the adhesive can hereby be carried out in a very targeted manner in several successive curing steps.

Radiation-curable adhesives in which the crosslinking reactions can be initiated by means of wavelengths between 250 nm and 420 nm, preferably in the range between 350 nm and 400 nm, are preferably used.

For example, an adhesive with the following formula n be used as radiation-curable adhesive:
 Urethane acrylate oligomer 40%
 Acrylate monofunctional 2(2-ethoxyethoxy)ethyl acrylate/(EOEOEA) 10%
 Acrylate difunctional ethoxylated (5) hedanediol diacrylate/(HD(5EO)DA) 15%
 Aliphatic urethane acrylate oligomer 20%
 Propoxylated trimethylolpropane triacrylate 10%
 Initiator 5%

In the case of the application by means of flexographic printing, the UV-curable adhesive is preferably printed with a dynamic viscosity of between 400 mPas and 2,000 mPas, preferably 500 mPas to 1,200 mPas.

It has been shown that a correspondingly good print quality can be achieved hereby.

Furthermore, it is also possible for the printing device 63 to have a curing device, by means of which the UV-curable adhesive is pre-cured during the printing or immediately after the printing. For this, it has proved worthwhile to carry out a pre-curing of the adhesive of more than 50%, preferably more than 80, and/or to increase the dynamic viscosity of the radiation-curable adhesive by means of the pre-curing by a value of from 20 mPas to 3,000 mPas, preferably by 50 mPas to 1,000 mPas. It has been shown that, through these measures, the print quality can furthermore be clearly improved, or respectively the stability of the radiation-curing adhesive is improved during the feeding of the transfer film.

In addition to the use of flexographic printing, the radiation-curable adhesive can also be printed by means of gravure printing, screen printing or digital printing or a combination of these printing methods.

In the case of gravure printing, the desired design is copied onto a gravure roller. With such a gravure roller, corresponding to the known gravure printing method, the radiation-curable adhesive is then printed onto the laminating film 21. The viscosity of the radiation-curable adhesive is preferably chosen to be less than 1,000 mPas in the case of gravure printing. Here too, the combination with a pre-curing device, as already stated above, has proved worthwhile in order to prevent a smearing of the radiation-curable adhesive in the subsequent process as far as possible.

Furthermore, it is also advantageous to print the radiation-curable adhesive by means of an inkjet printhead. In comparison with printing methods using fixed printing blocks, even individual, real-time designs are hereby possible. Here too, the use of a pre-curing device has proved worthwhile.

Furthermore, it is also possible for the printing device 63 to comprise different printing tools, for example a combination of a screen printing tool and/or a flexographic printing tool and/or an inkjet printing mechanism.

The transfer film 4 is unwound by the unwinding device 61 and initially fed to an optional surface-machining device 65 via web-guiding devices, not shown.

Figure 7A:
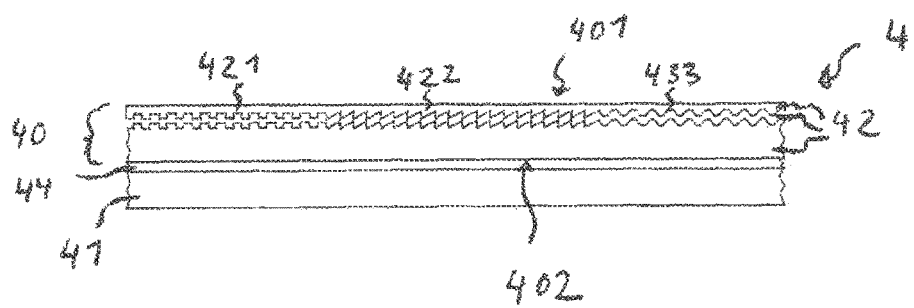
FIG. 7a and FIG. 7b illustrate, in sectional representation and in top view, the structure of a transfer film.
Figure 7B:
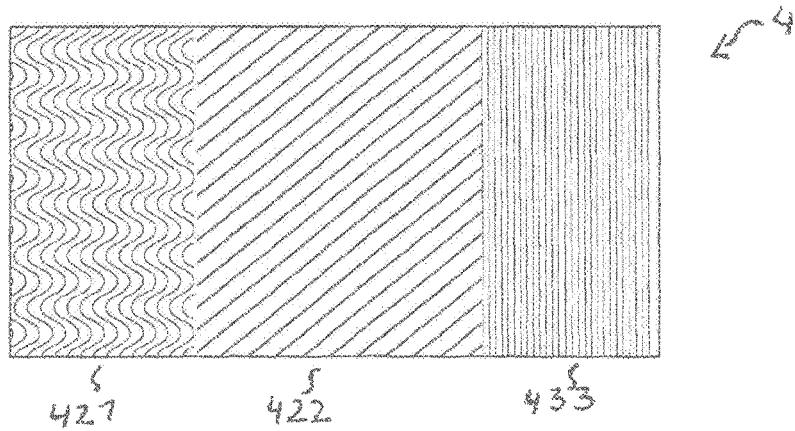

The transfer film 4 is for example constructed as illustrated in FIGS. 7a and 7b: the transfer film 4 has a carrier film 41, an optional detachment layer 44 and a decorative ply 40, which consists of one or more decorative layers 42.

The decorative ply 40 has a surface 401 facing away from the carrier film 41 and a surface 402 facing the carrier film 41.

The decorative layers 42 here can be formed as already described above in FIG. 2 and FIG. 3 with respect to the decorative layers 42. Here, the decorative ply 40 preferably has regions 421, 422 and 433, in which one or more of the decorative plies 42 are formed differently. Thus, by way of example, a top view of a section of the transfer film 4 with the three regions 421, 422 and 433 is shown in FIG. 7b, in which one or more of the decorative plies 42 are formed differently. Thus, it is possible for example for different optical relief structures, which generate in each case a different optically variable appearance, for example a different color change, when tilted and/or rotated, to be introduced into one of the decorative layers 42 in the regions 421, 422 and 433.

The optional surface-machining device 65 consists for example of a device which improves the surface quality of the surface 401, of the decorative ply 40 by means of corona and/or plasma treatment. Furthermore, it is also possible to provide the machining station already described above with respect to a pre-treatment of the laminating film 21 in addition to or as an alternative to the surface-machining device 65.

Optionally, the printing of the adhesive layer 5 can also be effected onto the transfer film 4 or a printing can be carried out both on the laminating film and on the transfer film 4. The two adhesive layers can be different or also similar or identical in terms of the composition and/or application weight.

The laminating film 21 and the transfer film 4 are then fed to a laminating device 64 via web-guiding devices, not shown. The laminating device 64 consists for example of two rollers, which bring the radiation-curable adhesive layer 5 printed on the surface 211 of the laminating film 211 into contact with the surface 401 of the decorative ply 40 of the transfer film 4 via roller gap formed between them.

Figure 8A:
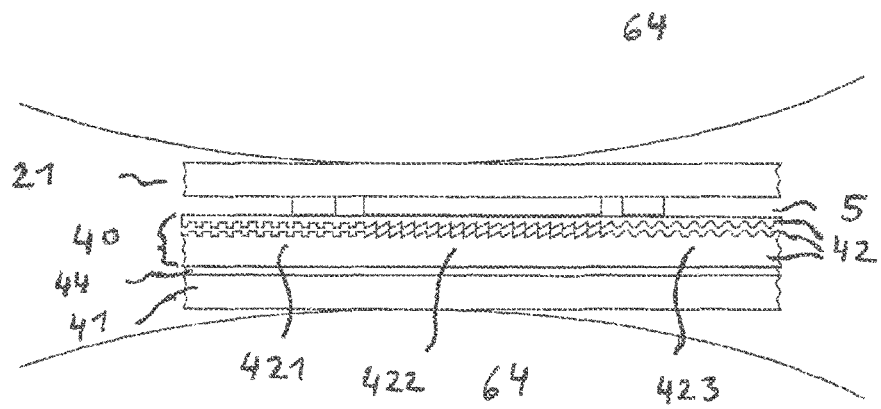
FIG. 8a and FIG. 8b illustrate, in sectional representation and in top view, an application of a transfer film to a laminating film.
Figure 8B:
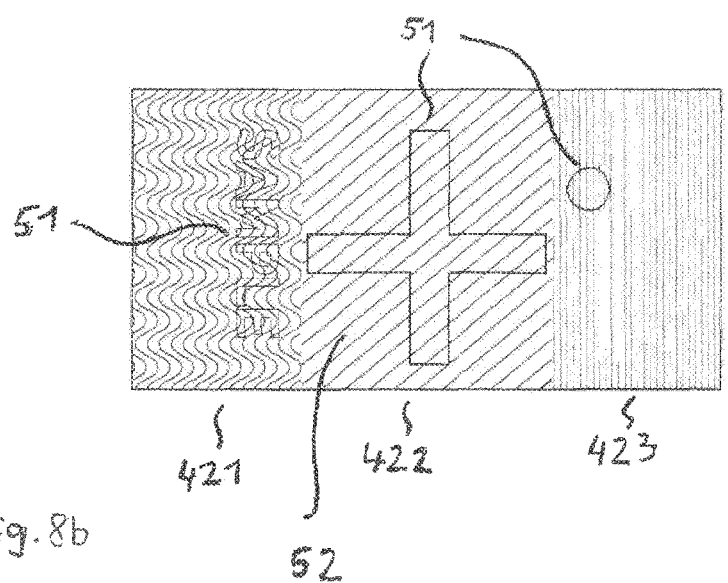

This is illustrated by way of example in FIGS. 8a and 8b:

FIG. 8a schematically shows a section of the two rollers of the laminating devices 64, which correspondingly bring together the laminating film 21 and the transfer film 4, with the result that the radiation-curable adhesive layer 5 is arranged between the laminating film 21 and the decorative ply 40. It is advantageous here to choose the contact pressure correspondingly, that the radiation-curable adhesive layer 5 wets both the surface 211 of the laminating film 21 and the surface 401 of the decorative ply 40 in the region of the first zones 51. The contact pressure of the laminating device 64 here is preferably to be set in such a way that a smearing of the radiation-curable adhesive layer is avoided during the laminating. For this, it has proved worthwhile to choose the contact pressure of the laminating device 64 to be between 0.05N/cm² and 100 N/cm², further preferably between 1 N/cm² and 10 N/cm².

Furthermore, the application of the transfer film 4 to the laminating film 21 is preferably controlled by means of a registration device. This registration device preferably has regulating means, by means of which it can bring about an alteration of the distance or tension of the laminating film 21 and/or the transfer film 4. By means of these regulating means and data about the positioning of the adhesive overprint, the laminating film 21 and/or the transfer film 4, which it detects for example by means of optical sensors, it regulates the positioning of the laminating film 21 with the radiation-curable adhesive layer 5, as well as the transfer film 4 with the differently formed decoration regions relative to each other in such a way that the adhesive overprint and the allocated regions of the transfer film 4 are applied to each other registered relative to each other by the laminating device 64.

A further option for registered transfer is to vary the circumferential speed of the printing tool, for example the printing roller or the printing screen relative to the movement speed of the transfer film 4 or the laminating film 21. This varying, known as tracking, can be −10 per mil to +10 per mil, preferably −5 per mil to +5 per mil of the movement speed of the transfer film 4 or the laminating film 21. This tracking can particularly preferably be carried out by means of inkjet, by controlling the ink ejection correspondingly in terms of timing, i.e. delaying or accelerating it. A combination of extending/adapting the distance of the transfer film 4 or the laminating film 21 and a tracking of the printing mechanism can also be used.

If the transfer film 4 is fed not as a single coherent web, but as several webs in individual webs separated from each other, the relative positions of the several webs are detected and synchronized through suitable measures described above.

This is illustrated for example in FIG. 8*b*, which illustrates a top view of the transfer film 4 laminated onto the laminating film 21 by the laminating device 64 after the laminating: as shown there, the regions 421, 422 and 423 of the decorative ply 40, in which it has different decorative layers, overlap here with correspondingly allocated first zones 51, in which the radiation-curable adhesive layer is provided. Thus, for example, the punctiform first zone 51 overlaps the allocated region 423, the cruciform first zone 51 overlaps with the allocated region 422 and the first zone 51 formed in the form of a lettering overlaps with the allocated region 421.

In order to guarantee this registration, register marks are preferably applied during the overprinting of the radiation-curable adhesive by means of the printing device 63, for example in the form of an overprint, a perforation, etc. Corresponding register marks are preferably also applied to the transfer film 4 or are already provided in the transfer film 4. Alternatively, the registration can also be effected through corresponding image acquisitions of decorative elements of the transfer film 4 or the laminating film 21 or the radiation-curable adhesive layer 5.

The layer structure of transfer film 4 and laminating film 21 is then fed to a curing device 65.

The curing device 65 is preferably a UV emitter or e-beam emitter. It has proved worthwhile here for example to use a mercury vapor lamp in such a way that a UV dose of more than 50 mJ/cm² is achieved. This can be in particular a radiation doped with iron or gallium. Furthermore, a UV-LED emitter can also be used. It is furthermore also possible here not to carry out the irradiation over the entire width of the material web, but to carry it out only selectively in the regions in which the radiation-curable adhesive layer 5 is provided. This can be effected for example through the use of corresponding masks or through corresponding activation, for example of a UV emitter matrix.

Figure 9:
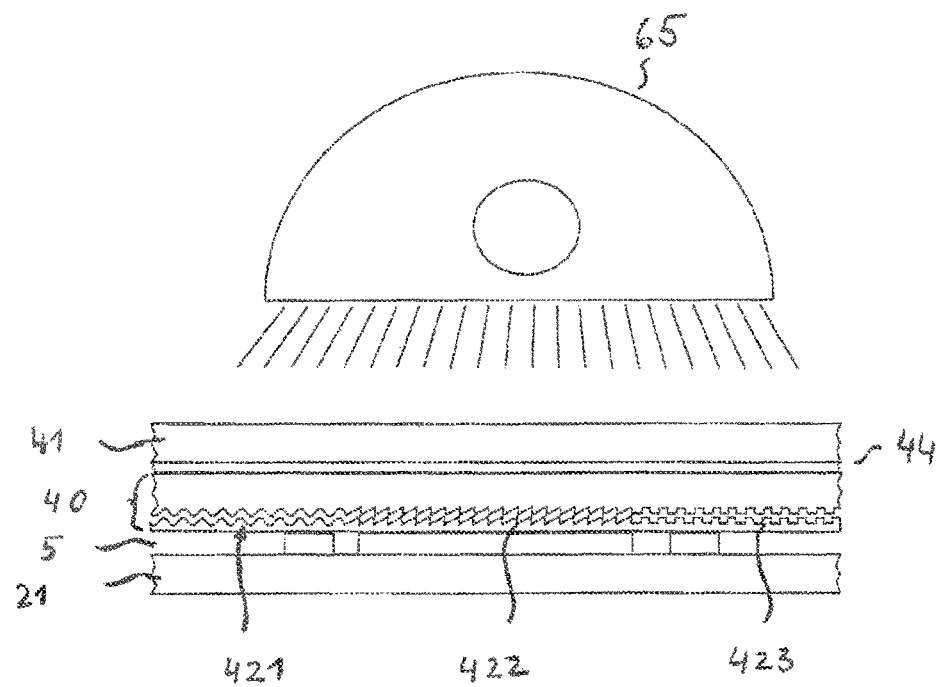
FIG. 9 illustrates, with reference to a schematic sectional representation, a curing of a radiation-curable adhesive layer, which is arranged between a laminating film and a transfer film.

A corresponding irradiation of this layer structure with the curing device 65 is shown in FIG. 9: thus, for example, the layer structure consisting of carrier film 41, optional detachment layer 44, decorative ply 40, radiation-curable adhesive layer 5 and laminating film 21 is irradiated from sides of the carrier film 41 with the radiation source of the curing device 65. Furthermore, it is also possible to carry out the irradiation from the opposite side, or to provide several radiation sources, also on both sides of the layer structure according to FIG. 9, in the curing device 65.

Furthermore, it is also possible to dispense with the curing device 65 if the radiation-curable adhesive layer 5 already ensures a sufficient difference in adhesion in the first and second zones 51 and 52 in the present state.

The present layer structure is then fed to a separating device 65. The separating device 65 preferably consists of a pair of rollers and/or a deflection about a knife blade and/or a separating blade and/or a blast air strip, or a combination thereof, which allows the transfer film 4 to be peeled off the laminating film 21 under controlled conditions.

During the peeling, the difference in the inter-layer adhesion between the first zones 51 with the radiation-curable adhesive layer 5 and the second zones 52 without the radiation-curable adhesive layer 5 between the decorative ply 40 and the laminating film 21 has the effect that in first partial regions 31 the decorative ply 40 is detached from the carrier film 41 when peeled off and remains on the laminating film 21, and in second partial regions 32 the decorative ply 40 and the carrier film 41 remains and is peeled off with the carrier film 41.

Figure 10A:
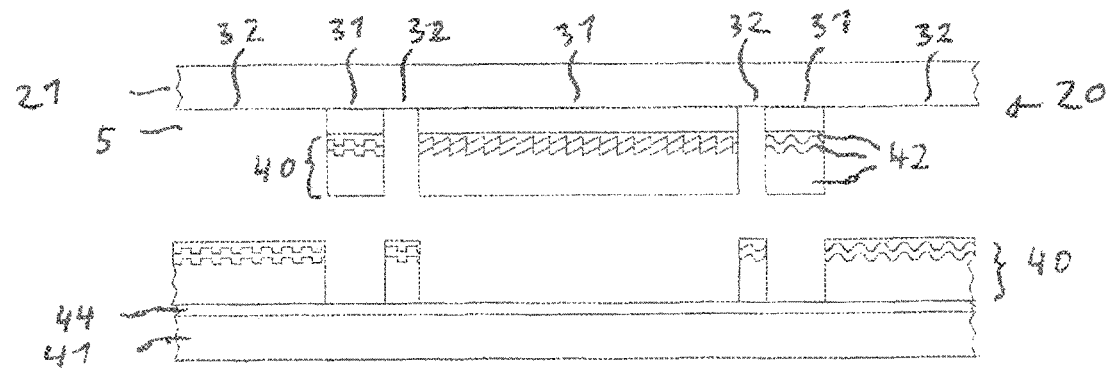
FIG. 10a and FIG. 10b illustrate, with reference to a sectional representation and a top view, a peeling of a transfer film off a laminating film.
Figure 10B:
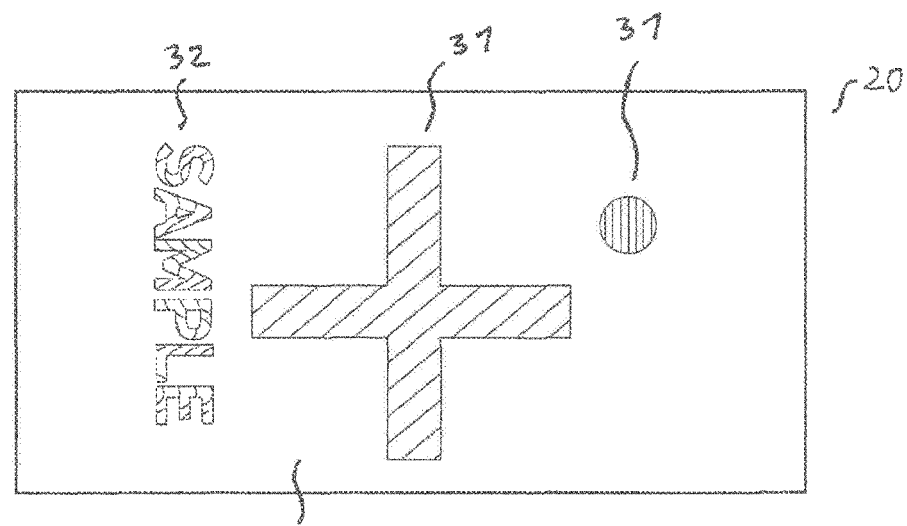

This is illustrated by way of example in FIG. 10*a* and FIG. 10*b*:

FIG. 10*a* shows a sectional representation of the layer structure after peeling off. A layer structure of the radiation-curable adhesive layer 5 and the decorative ply 40 is provided on the laminating film 21 in the first partial regions 31 on the surface 211. This layer structure forms a laminating inlay 2, which is wound onto a supply roll in a winding device 67. The "rest" of the transfer film 4 peeled off this only has the decorative ply 40 still in the second partial regions 32. This rest of the transfer film is fed to a winding device 66 and wound onto a supply roll there. This rest can optionally be re-used in order to make it possible to utilize the decorative ply 40 as much as possible.

FIG. 10*b* shows a top view of a section of the laminating inlay 2: because of the above-described register-accurate application of the transfer film 4 relative to the radiation-curable adhesive layer 5, the laminating inlay 2 has different first partial regions 31, in which different motifs with different optically variable effects are produced.

The procedure according to FIG. 4 is a roll-to-roll machining process, which preferably proceeds at a rate of between 0 al/min and 80 m/min, preferably between 15 m/min and 45 m/min. Alternatively, however, the method can also be carried out in a sheet method, in which individual sheets are correspondingly printed, laminated, cured and separated.

The laminating inlay 2 produced according to FIG. 4 can then also be processed further by means of a sheet-based method. For this, the width of the laminating films 21 corresponds at least to the width of the sheet format used for this or a multiple of this sheet format. The laminating film 21 can furthermore also have a larger width for the transfer process and the edges can be cut to the desired width in a later machining process. An excess width has the advantage that, because of the subsequent cutting, the edges are clean, and possible tolerances of the printing relative to the web edge can be compensated for. However, logistical reasons can also argue for this if a web width is easily available or can be used as standard. Furthermore, depending on the plant design for precisely advancing the laminating film 21, transport tracks can necessarily be provided there, which have to be removed. It can also be necessary to apply position marks or register marks and other items of information, control tracks, etc. to the laminating film 21, which then have to be cut off again subsequently.

Furthermore, an adhesive layer can additionally also be printed on the laminating film 21 in order to improve the adhesion for the laminating with plastic films, for example made of PET, PET-G, ABS and PVC, This coating can be effected on one or both sides and can be effected for example before the radiation-curable adhesive is printed on and/or after the transfer film is peeled off.

During the laminating of the laminating inlay 2 with further laminating films to form a laminated body, a roll-to-roll process, but also a sheet-based process, can likewise be used. It is advantageous here likewise to provide a corresponding registration between the films laminated with each other.

The laminating inlay 2 here can have the same width in the format as the laminating films with which it is laminated. Furthermore, it is also possible for the laminating inlay 2 to be fed on the basis of several individual rolls, which have for example the width of the individual documents. Advantageously, the width of the film rolls with the laminating inlay 2 here is a little larger than the counter-laminated laminating film in order to mask lateral tolerance during the feeding or in order to leave space for register marks and further technical tracks necessary if need be.

In the case of individual tracks fed, it is particularly advantageous that these individual rolls are guided registered relative to each other, both transverse to and along the direction of travel.

The laminating inlay 2 can also be correspondingly cut to size and finished before the laminating with further laminating films, in order to be processed further for example in a sheet process. Thus, the laminating inlay 2 can for example be cut to sheet format or cut into webs with a smaller width, in order to adapt the film width to that of a belt laminator which is used for the lamination with the further laminating films. For the laminating, the laminating inlay 2 is bundled with one or more laminating films to form a laminating packet, which preferably corresponds to the desired security document. After the laminating, the desired document formats are stamped out of the joined plates and processed further e.g. with personalization.

Further materials that can be laminated consist for example of a carrier made of polyester, which is coated with a heat seal adhesive. Typical thicknesses lie in the range between 25 μm and 200 μm, both with respect to the polyester carrier and with respect to the heat seal adhesive. The decorative plies are applied to the surface of the adhesive layer. After application, at least partial overcoating with a further adhesive layer is effected, with the result that a bond to the document substrate is also achieved in the region of the decorative ply in the subsequent laminating process. Such a structure is suitable in particular to prevent manipulation attempts. Such laminating films are used for example to seal paper-based documents on one or two sides in a roll laminator.

Furthermore, it is also possible for the process illustrated in FIG. 4 to be repeated multiple times with different transfer films 4 or for not only one, but several transfer films 4 to be brought into contact with the laminating film 21 at the same time or in succession in the process shown in FIG. 4. Furthermore, it is also possible here to use in each case different radiation-curable adhesives or to use differently dyed radiation-curable adhesives. The furthermore applied decorative plies 40 can here be applied to the same side of the laminating film 21, or also to different sides of the laminating film. The decorative plies 40 applied by means of different transfer films and/or radiation-curable adhesive layers here are advantageously arranged registered relative to each other. This is achieved through corresponding registration of the printing processes and/or registration of the transfer films relative thereto, as already described above.

Furthermore, it is also possible for additional decorative layers to be printed, by means of further printing mechanisms, on the laminating film 21 and/or the decorative ply 40, preferably registered, and/or to be transferred by means of stamping processes, such as for example hot stamping.

Figure 11:
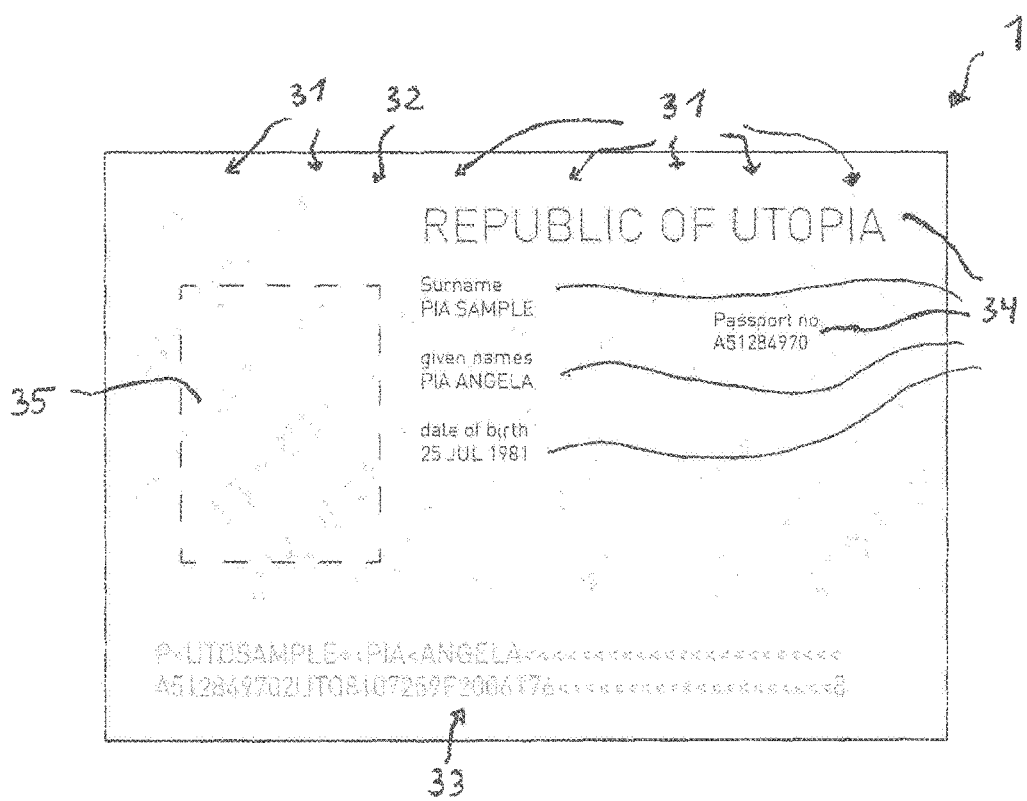
FIG. 11, FIG. 12 and FIG. 13 show a schematic top view of a security document.
Figure 12:
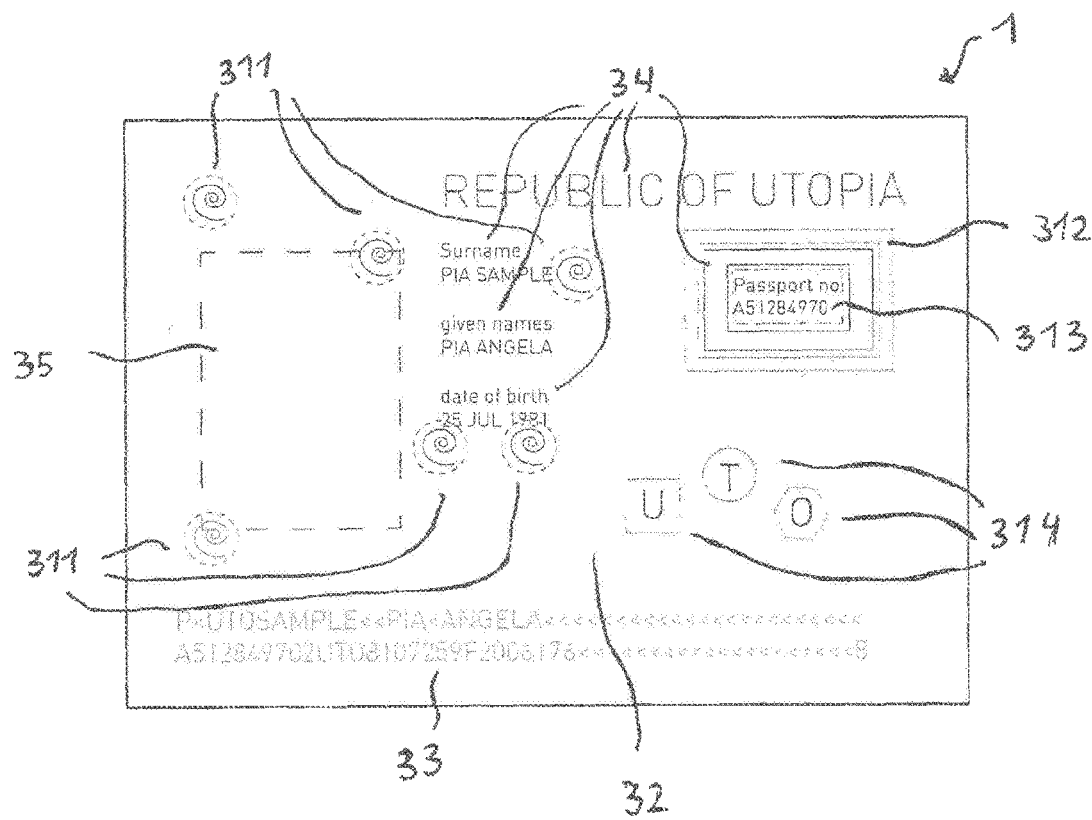
Figure 13:
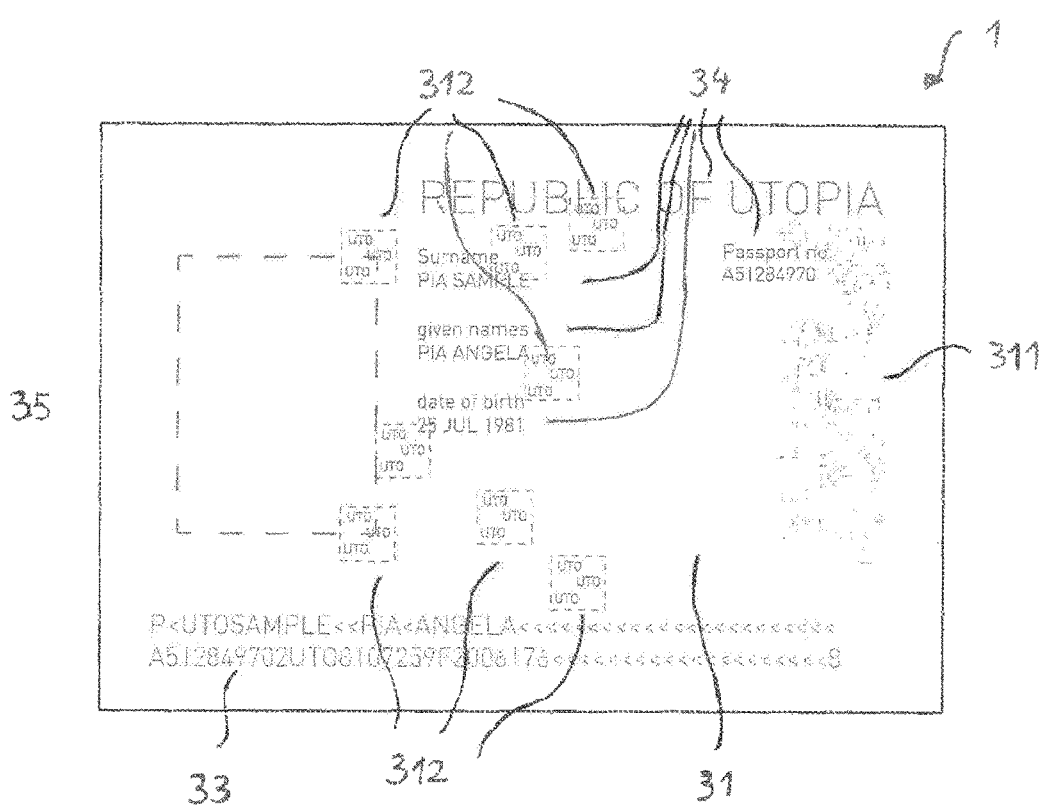

Several laminated bodies 1 in the form of security documents, which are produced by means of corresponding laminating inlays 2, are shown in FIGS. 11 to 13:

FIG. 11 to FIG. 13 in each case show a laminated body 1, the layer structure of which corresponds to the laminated body according to FIG. 1.

In the case of the laminated body 1 according to FIG. 11, the first partial regions 31 are formed in the form of a raster with raster elements, which are molded in the form of a sequence of letters (sequence of letters "UTO"). The decorative ply 40 provided there consists of a diffractive structure which is provided with an HRI layer and which has a background over the whole surface for the further security elements provided in the layer structure, here a passport photo 35 as well as individual items of information 33 and 34 produced by means of laser personalization. The first partial regions 31 here are surrounded over the whole surface by a second partial region 32.

The laminated body 1 according to FIG. 12 has first partial regions 311, 312, 313 and 314, which in each case have decorative plies 40 of different transfer films 4. In the first partial regions 311 a decorative ply 40 is provided, which is formed of a diffractive structure and an HRI layer. The first partial region 312 is provided with a decorative ply 40, which has only an HRI layer. The first partial regions 313 have a decorative ply 40 with an HRI layer, wherein the radiation-curable adhesive layer is applied here by means of a digital printing method, in particular inkjet printing.

Furthermore, it is also possible for the first partial regions 313 to have an overprint produced by means of a digital printing method, in particular inkjet printing, in particular a personalized overprint. This overprint is for example printed onto the decorative ply 40 or onto the laminating film 21. The radiation-curable adhesive layer 5 preferably overlaps this overprint at least in regions.

The first partial regions 314 have in each case a structured metal layer registered relative to a further diffractive structure. The first partial regions 311, 312, 313 and 314 here are arranged registered relative to each other and furthermore registered relative to the remaining security features 35, 34, and 33. This is achieved through the above-described measures.

The partial regions 311 and 314 here in each case form a motif region, inside which in each case at least one motif of the decorative ply 40 is provided. The molding of the respective motif region is indicated with respect to the partial regions 311 by means of a dashed outline, inside which a motif in the form of a spiral is arranged by way of example. With respect to the partial regions 314, in FIG. 12 this is indicated by a border line, by way of example a rectangular, circular and octagonal border line, which forms the boundary line of the respective motif region and in which in each case at least one motif is provided in the decorative ply 40, here in the form of the letters U, T and O by way of example.

The motif regions here preferably have a closed contour line, which is formed in particular in the form of a geometric figure, a logo, an alphanumeric character or a pattern. Inside the respective motif region, one or more motifs are provided, which are preferably formed in the form of alphanumeric characters, codes, graphics, images or patterns. Outside the motifs, the respective partial region 311 or 314 of the decorative ply is preferably formed transparent and for example has no opaque decorative layer in these partial regions. Here, the transparency outside the motifs of the decorative ply 40 is preferably formed such that for the human observer the decorative ply 40 is indistinguishable from the background there and thus does not appear optically for the human observer.

In the first partial regions 311, the laminated body 1 according to FIG. 13 has a decorative ply 40 with an HRI layer and a diffractive structure, which is provided on a dyed, radiation-curable adhesive layer 5. The color of the diffractive structure is thus determined correspondingly by the radiation-curable adhesive layer 5. The first partial regions 312 have a decorative ply 40, which have a patterned varnish layer with IR pigments as well as optionally further decorative layers. Here too, the first partial regions 311 and 312 are arranged registered relative to each other as well as to the further security features 31, 34 and 35. This is achieved through the above-described measures.

Figure 14:
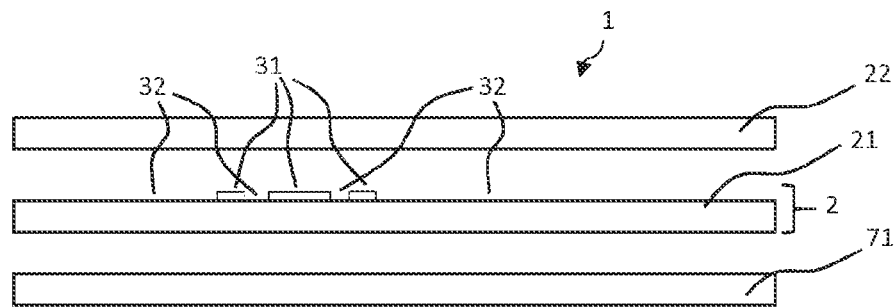

FIG. 14 shows a laminated body 1 with the laminating inlay 2 and the laminating film 21, which is in particular the above-mentioned first laminating film, as well as the laminating film 22, which is in particular the above-mentioned second laminating film, and the laminating film 71, which is in particular the above-mentioned first laminating film of the one or more further laminating films. Here, the laminating film 21 advantageously comprises polycarbonate, wherein the laminating film 71 and the laminating film 22 preferably comprise polyvinyl chloride.

FIG. 14 shows in particular the layer structure shown in FIG. 1 of a laminated body 1, except for the fact that the laminating films 23 to 27 are not shown, and the laminating film 71 is shown instead. However, it is also conceivable that at least one of the laminating films 23 to 27 is provided and/or laminated to form the laminated body.

The laminating film 21 is preferably opaque, in particular in the wavelength range visible to the human eye. The laminating films 22 and 71 here are preferably transparent, in particular in the wavelength range visible to the human eye. It is furthermore also possible for the laminating film 21 to be white and/or to be printed for the human eye.

With respect to the design of the laminating inlay 2, in particular the decorative ply in the first partial regions 31 of the laminating inlay 2, reference is made here in particular to FIG. 1 and/or FIG. 2.

Figure 15:
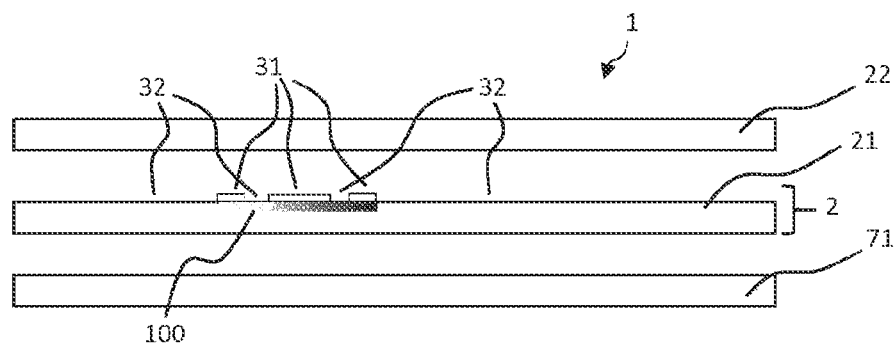

FIG. 15 shows the laminated body 1 shown in FIG. 14, except for the fact that a lasered partial region 100 is introduced into the laminating inlay 2, in particular the laminating film 21, which preferably forms a grayscale image, in particular through a halftone raster generated by means of lasers. The lasered partial region 100 here is arranged, for example when viewed perpendicular to a plane spanned by the laminating film 21, preferably in the direction from the laminating film 22 to the laminating film 21, registration-accurately under and next to the first partial regions 31.

Figure 16:
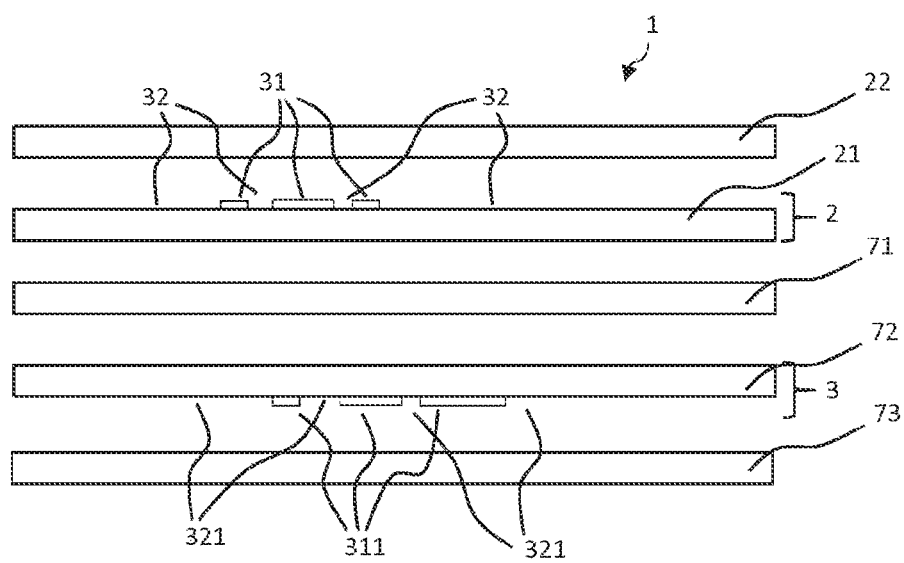

FIG. 16 shows a laminated body 1 with the laminating inlay 2 and a laminating inlay 3, which is in particular the above-mentioned further laminating inlay, with the laminating films 21, 22 and 71 and with the laminating film 73, which is in particular the above-mentioned third laminating film of the one or more further laminating films.

FIG. 16 shows in particular the layer structure shown in FIG. 1 of a laminated body 1, except for the fact that the laminating films 23 to 27 are not shown, and the laminating films 71 to 73 are shown instead. However, it is also conceivable that at least one of the laminating films 23 to 27 is provided and/or laminated to form the laminated body 1.

The laminating inlay 3 has first partial regions 311, which are in particular the above-mentioned one or more further first partial regions with the further decorative ply, and has second partial regions 321, which are in particular the above-mentioned one or more further second partial regions.

With respect to the design of the laminating inlay 3, in particular the decorative ply, preferably the further decorative ply, in the first partial regions 311 of the laminating inlay 3, reference is made here in particular to FIG. 1 and/or FIG. 2.

As can be seen in FIG. 16, the first partial regions 311 and the second partial regions 321 of the further laminating inlay 3 can be designed offset relative to the first partial regions 31 and the second partial regions 32 of the laminating inlay 2 represented at the top in FIG. 16.

Furthermore, it is possible for the decorative ply in the first partial regions 311 of the laminating inlay 3 and the decorative ply in the first partial regions 31 of the laminating inlay 2 represented above it to be designed differently.

The laminating film 21 and the laminating film 72 preferably consist of polycarbonate and/or comprise polycarbonate, wherein the laminating films 22, 71 and 73 preferably consist of polyvinyl chloride and/or comprise polyvinyl chloride.

The laminating film 71 is preferably opaque, in particular in the wavelength range visible to the human eye. The laminating films 71, 21, 73 and/or 22 are preferably transparent, in particular in the wavelength range visible to the human eye.

Advantageously, the laminating film 71 is single- or multi-layered and in particular acts as adhesion-promoter between the laminating film 21 and the laminating film 72.

The laminating film 21, 71 and/or 72 is preferably machined by means of a laser at least partially through one of the partial regions 31 and/or 311 of the laminating inlay 2 and/or of the laminating inlay 3, in particular with the result that a lasered partial region is arranged registration-accurately over, under and/or next to the first partial regions 31 and/or 311 of the laminating inlay 2 and/or of the laminating inlay 3.

Furthermore, it is preferably possible for additional laminating inlays made of additional laminating films with additional decorative plies to be arranged in the laminated body 1, in particular on a side of the laminating film 22 and/or of the laminating film 73 facing away from the laminating film 21.

In FIG. 16 additional laminating films are also conceivable, in particular which are arranged on the side of the laminating film 22 and/or of the laminating film 73 facing away from the laminating inlay 2 and/or the laminating inlay 3 and/or on an additional laminating inlay and which in particular comprise polyvinyl chloride and/or are made of polyvinyl chloride and/or are transparent, in particular in the wavelength range visible to the human eye.

Figure 17:
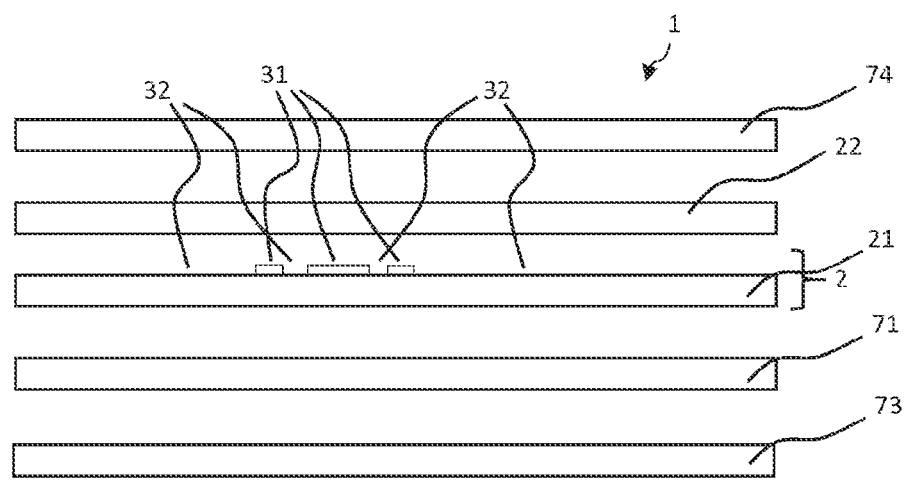

FIG. 17 shows the laminated body 1 shown in FIG. 14 and/or FIG. 15, except for the fact that the laminated body 1 furthermore has the laminating film 73, which is in particular the above-mentioned third laminating film of the one or more further laminating films, and the laminating film 74, which is in particular the above-mentioned fourth laminating film of the one or more further laminating films.

FIG. 17 shows in particular the layer structure shown in FIG. 1 of a laminated body 1, except for the fact that the laminating films 23 to 27 are not shown, and the laminating films 71 and 73 are shown instead, and furthermore in particular the laminating film 74 is shown in the layer structure.

It is preferably possible here for the one or more further laminating films not to have the second laminating film of the one or more further laminating films here, in particular with the result that the laminated body 1 has a laminating inlay 2.

Here, the laminating films 73 and 74 preferably consist of polyvinyl chloride and/or comprise polyvinyl chloride. The laminating films 73 and 74 are preferably transparent, in particular in the wavelength range visible to the human eye.

Furthermore, it is preferably possible for additional laminating inlays made of additional laminating films with additional decorative plies to be arranged in the laminated body 1, in particular on a side of the laminating film 74 and/or of the laminating film 73 facing away from the laminating film 21.

Additional laminating films are also conceivable, in particular which, in FIG. 17, are arranged on the side of the laminating film 73 and/or of the laminating film 74 facing away from the laminating inlay 2 and/or the laminating inlay 3 and/or on an additional laminating inlay and which in particular comprise polyvinyl chloride and/or are made of polyvinyl chloride and/or are transparent, in particular in the wavelength range visible to the human eye.

LIST OF REFERENCE NUMBERS 1 laminated body
2 laminating inlay
4 transfer film
5 radiation-curable adhesive layer
6 production device
21 laminating film
22, 23, 24, 25, 26, 27 laminating film
71, 72, 73, 74 laminating film
31 partial region
32 partial region
311 partial region
321 partial region
33, 34, 35 security feature
40 decorative ply
41 carrier film
42 decorative layer
43 detachment layer
44 separating layer/adhesion-promoting layer
45 protective layer
46 adhesion-promoting layer
51 zone
52 zone
61, 62 unwinding device
63 printing device
64 laminating device
65 surface-machining device
66, 67 winding device
211, 212 surface
401, 402 surface
311, 312, 313, 314 partial region
421, 422, 423, 433 region
100 lasered partial region

The invention claimed is:

1. A method for producing a laminated body wherein the method comprises the following steps:
providing a first laminating film, with a first surface and a second surface opposite it,
providing at least one transfer film, which comprises in each case a carrier film and a decorative ply which is detachable from the carrier film and has a first surface opposite the carrier film and a second surface facing the carrier film,
printing a radiation-curable adhesive on the first surface of the first laminating film and/or the first surface of the decorative ply of the at least one transfer film in such a way that the radiation-curable adhesive is applied to the respective first surface of the first laminating film and/or the decorative ply in one or more first zones and forms a radiation-curable adhesive layer in the one or more first zones, and is not applied to the respective first surface of the first laminating film and/or the respective decorative ply in one or more second zones such that the adhesive layer is present in only the one or more first zones,
applying the at least one transfer film to the first surface of the first laminating film in such a way that at least one partial region of the one or more first zones with the radiation-curable adhesive layer and at least one partial region of the one or more second zones, in which the radiation-curable adhesive layer is not applied, are arranged between the first surface of the respective decorative ply and the first surface of the first laminating film,
completely curing the entire radiation-curable adhesive layer present on the first surface of the first laminating film and/or the decorative ply in a single step so that no regions of the adhesive layer are left uncured,
peeling the at least one transfer film off the first laminating film, wherein, in one or more first partial regions which overlap with at least one of the first zones at least in regions the decorative ply is detached from the carrier film when peeled off and remains on the first laminating film, and in one or more second partial regions the decorative ply remains on the carrier film and is peeled off with the carrier film so that the decorative ply is transferred wherever adhesive is present, and
laminating several successive films to form the laminated body, the several successive films comprising:
the first laminating film with the one or more first partial regions with the decorative ply;
a second laminating film arranged facing the first surface of the first laminating film; and
a third laminating film arranged facing the second surface of the first laminating film, the third laminating film comprising polyvinyl chloride or polycarbonate, wherein, during the laminating, the second laminating film is applied to the first laminating film in such a way that, in a first region of surface, one or more of the first partial regions with the decorative ply and the radiation-curable adhesive layer are arranged between the first surface of the first laminating film and a first surface of the second laminating film facing the first surface of the first laminating film, and wherein, in a second region of surface, the first surfaces of the first laminating film and of the second laminating film touch, and wherein, during the laminating, the first surfaces of the first laminating film and the second laminating film are fused to each other at least over part of the surface in the second region of surface, and wherein the area ratio of the first region of surface to the sum of first and second regions of surface is not more than 80%, and wherein the method further comprises the step of introducing a lasered partial region into at least one of the first laminating film, the second laminating film and the third laminating film, and wherein the decorative ply comprises:
an HRI layer applied over a full surface area of the decorative ply; and
a metal layer applied over a partial area of the full surface area of the decorative ply.

2. The method according to claim 1, wherein the area ratio of the first region of surface to the second region of surface is chosen such that the adhesion between the first and the second laminating film after the laminating is more than 3.5 N.

3. The method according to claim 1, wherein one or more of the second partial regions are delimited by an outer edge of the laminated body and have a width of more than 2 mm.

4. A method for producing a laminating inlay, wherein the method comprises the following steps:
providing a first laminating film, with a first surface and a second surface opposite it,
providing at least one transfer film, which comprises in each case a carrier film and a decorative ply which is detachable from the carrier film and has a first surface opposite the carrier film and a second surface facing the carrier film,
printing a radiation-curable adhesive on the first surface of the first laminating film and/or the first surface of the decorative ply of the at least one transfer film in such a way that the radiation-curable adhesive is applied to the respective first surface of the first laminating film and/or the decorative ply in one or more first zones and forms a radiation-curable adhesive layer in the one or more first zones, and is not applied to the respective first surface of the first laminating film and/or the decorative ply in one or more second zones,
applying the at least one transfer film to the first surface of the first laminating film in such a way that at least one partial region of the one or more first zones with the radiation-curable adhesive layer and at least one partial region of the one or more second zones in which the radiation-curable adhesive layer is not applied are arranged between the first surface of the decorative ply and the first surface of the laminating film,
at least partially curing the radiation-curable adhesive layer,
peeling the at least one transfer film off the first laminating film, wherein, in one or more first partial regions which overlap with at least one of the first zones at least in regions, the decorative ply is detached from the carrier film when peeled off and remains on the first laminating film, and in one or more second partial regions the decorative ply remains on the carrier film and is peeled off with the carrier film, wherein an area ratio of the one or more first partial regions to a sum of the one or more first partial regions and the one or more second partial regions is not more than 80%, and wherein a minimum spacing between several first partial regions is more than 1 mm, and wherein the one or more first partial regions and/or the one or more second partial regions have a width of 0.1 mm or more, and wherein the first surface of the laminating film has a surface roughness Ra of less than 1 µm and a gloss level at an angle of 60° according to ISO 2813 of more than 98 GU, and wherein the decorative ply comprises:
an HRI layer applied over a full surface area of the decorative ply; and
a metal layer applied over a partial area of the full surface area of the decorative ply.

5. The method according to claim 4, wherein, in the printing, a radiation-curable adhesive is printed which has a higher softening temperature than the first laminating film after the curing has been carried out.

6. The method according to claim 4, wherein the printing of the radiation-curable adhesive is effected with an application weight of between 0.2 g/m² and 20 g/m².

7. The method according to claim 4, wherein the radiation-curable adhesive is printed with a dynamic viscosity of between 400 mPas and 2,000 mPas.

8. The method according to claim 4, wherein the printing is effected by means of flexographic printing, screen printing, gravure printing and/or inkjet printing.

9. The method according to claim 4, wherein the radiation-curable adhesive layer is dyed.

10. The method according to claim 4, wherein the first laminating film and/or the at least one transfer film have a transparency of more than 10% for the wavelength range of the irradiation.

11. The method according to claim 4, wherein the first partial region(s) have a width of not more than 8 mm.

12. The method according to claim 4, wherein one or more of the first partial regions and/or of the second partial regions have a width of between 0.1 mm and 0.6 mm.

13. The method according to claim 4, wherein the first and/or second laminating film consists of a thermoplastic.

14. The method according to claim 4, wherein the first and/or second laminating film has a thickness of between 30 µm and 400 µm.

15. The method according to claim 4, wherein, during the application of the at least one transfer film to the first surface of the first laminating film, the radiation-curable adhesive layer is brought into contact with the decorative ply and with the first surface of the first laminating film in the one or more first partial regions, but is not brought into contact with the decorative ply or the first surface of the first laminating film in the one or more second partial regions.

16. The method according to claim 4, wherein the one or more first partial regions are at least 80%, covered by the radiation-curable adhesive layer on their surface facing away from the first laminating film after the carrier film has been peeled off.

17. The method according to claim 4, wherein one or more of the first partial regions are arranged in the form of one or more motif regions.

18. The method according to claim 4, wherein the steps of applying and peeling off the at least one transfer film are repeated multiple times.

19. The method according to claim 4, further comprising the step of introducing a lasered partial region into the first laminating film.

20. A laminating inlay comprising a first laminating film, with a first surface and a second surface opposite it,
- wherein at least one decorative ply detached from a carrier film of at least one transfer film and a radiation-curable adhesive layer, which is at least partially cured, arranged between the decorative ply and the first surface of the first laminating film are provided in one or more first partial regions, and the at least one decorative ply is not provided, and is peeled off with the carrier film, in one or more second partial regions,
- wherein an area ratio of the one or more first partial regions to a sum of the one or more first partial regions and the one or more second partial regions is not more than 80%, and
- wherein a minimum spacing between several first partial regions is more than 1 mm, and
- wherein the one or more first partial regions and/or the one or more second partial regions have a width of 0.1 mm or more, and
- wherein the first surface of the laminating film has a surface roughness Ra of less than 1 µm and a gloss level at an angle of 60° according to ISO 2813 of more than 98 GU, and
- wherein the decorative ply comprises:
  - an HRI layer applied over a full surface area of the decorative ply; and
  - a metal layer applied over a partial area of the full surface area of the decorative ply.

21. The laminating inlay according to claim 20, wherein the first laminating film is laserable.

22. A laminated body comprising several successive films, the several successive films comprising:
- a first laminating film;
- a second laminating film arranged facing a first surface of the first laminating film; and
- a third laminating film arranged facing a second surface of the first laminating film opposite the first surface, the third laminating film comprising polyvinyl chloride or polycarbonate,
- wherein the first laminating film, the second laminating film and the third laminating film are laminated with each other to form the laminated body, and
- wherein at least one decorative ply detached from a carrier film of at least one transfer film and a radiation-curable adhesive layer, which is at least partially cured, arranged between the decorative ply and the first surface of the first laminating film are provided in one or more first partial regions, and the at least one decorative ply is not provided, and is peeled off with the carrier film, in one or more second partial regions, and
- wherein the second laminating film is applied to the first laminating film in such a way that, in a first region of surface, one or more of the first partial regions with the decorative ply and the radiation-curable adhesive layer are arranged between the first surface of the first laminating film and a first surface of the second laminating film facing the first surface of the first laminating film, and wherein, in a second region of surface, the first surfaces of the first laminating film and of the second laminating film touch, and wherein, during the laminating, the first surfaces of the first laminating film and the second laminating film are fused to each other at least over part of the surface in the second region of surface, and
- wherein the area ratio of the first region of surface to the sum of first and second regions of surface is not more than 80%, and
- wherein the adhesive layer is present in only the one or more first zones, and
- wherein the entire radiation-curable adhesive layer arranged between the first surface of the first laminating film and the decorative ply is cured in a single step so that no regions of the adhesive layer are left uncured, and
- wherein the decorative ply is transferred wherever adhesive is present, and
- wherein at least one of the first laminating film, the second laminating film and the third laminating film is provided with a lasered partial region, and
- wherein the decorative ply comprises:
  - an HRI layer applied over a full surface area of the decorative ply; and
  - a metal layer applied over a partial area of the full surface area of the decorative ply.

23. A security document, with a laminated body according to claim 22.

* * * * *